(12) United States Patent
Higashi et al.

(10) Patent No.: US 8,298,299 B2
(45) Date of Patent: Oct. 30, 2012

(54) AZO PIGMENT OR TAUTOMER THEREOF, PROCESS FOR PRODUCING SAME, PIGMENT DISPERSION, COLORING COMPOSITION, INKJET RECORDING INK, COLORING COMPOSITION FOR COLOR FILTER, AND COLOR FILTER

(75) Inventors: Masahiro Higashi, Shizuoka (JP); Yoshihiro Jimbo, Shizuoka (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/118,793

(22) Filed: May 31, 2011

(65) Prior Publication Data

US 2011/0294993 A1    Dec. 1, 2011

(30) Foreign Application Priority Data

May 31, 2010  (JP) .................................. 2010-125326
May 31, 2010  (JP) .................................. 2010-125327

(51) Int. Cl.
*A61Q 5/10* (2006.01)
*C09D 11/00* (2006.01)

(52) U.S. Cl. .......... 8/637.1; 8/639; 8/688; 8/690; 8/691; 106/31.6

(58) Field of Classification Search .................. 8/637.1, 8/639, 688, 690, 691; 106/31.6
See application file for complete search history.

(56) References Cited

U.S. PATENT DOCUMENTS

| | | | |
|---|---|---|---|
| 2008/0058531 A1 | | 3/2008 | Schmidt et al. |
| 2011/0143270 A1* | | 6/2011 | Seto et al. .......................... 430/7 |

FOREIGN PATENT DOCUMENTS

| | | | |
|---|---|---|---|
| JP | 58-210084 A | | 12/1983 |
| JP | 5-222314 A | | 8/1993 |
| JP | 8-048908 A | | 2/1996 |
| JP | 2010-047750 A | | 3/2010 |
| WO | 2009/110554 A1 | | 9/2009 |
| WO | 2010/008081 A1 | | 1/2010 |
| WO | WO 2010/008081 A1 * | | 1/2010 |
| WO | 2010/026969 A1 | | 3/2010 |

OTHER PUBLICATIONS

STIC Search Report dated Jul. 28, 2011.*
Extended European Search Report dated Sep. 8, 2011, in corresponding European Application No. 11168044.3.

* cited by examiner

*Primary Examiner* — Eisa Elhilo
(74) *Attorney, Agent, or Firm* — Sughrue Mion, PLLC

(57) ABSTRACT

An azo pigment selected from the group consisting of: an azo pigment represented by the following formula (1), which has: a characteristic X-ray diffraction peak at Bragg angles (2θ±0.2°) of 6.9°, 21.5°, and 27.3° in CuKα characteristic X-ray diffraction, a peak height at 11.9° of 0.6 or less relative to a peak height at 10.9° or a tautomer thereof, or a salt, hydrate, or solvate of the azo pigment or tautomer thereof; and an azo pigment represented by the following formula (1), which has: a characteristic X-ray diffraction peak at Bragg angles (2θ±0.2°) of 6.9°, 25.8°, and 27.1° in CuKα characteristic X-ray diffraction, a peak height at 10.9° of 0.2 or less relative to a peak height at 11.9° or a tautomer thereof, or a salt, hydrate, or solvate of the azo pigment or tautomer thereof.

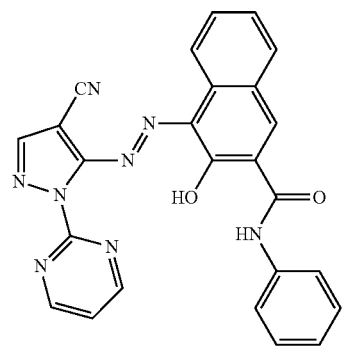 (1)
14 Claims, 3 Drawing Sheets

AZO PIGMENT OR TAUTOMER THEREOF, PROCESS FOR PRODUCING SAME, PIGMENT DISPERSION, COLORING COMPOSITION, INKJET RECORDING INK, COLORING COMPOSITION FOR COLOR FILTER, AND COLOR FILTER

CROSS-REFERENCE TO RELATED APPLICATION(S)

The present application claims priority from Japanese Patent Application Nos. 2010-125326 filed on May 31, 2010 and 2010-125327 filed on May 31, 2010, the entire content of which is incorporated herein by reference.

BACKGROUND

1. Field

The present invention relates to an azo pigment or tautomer thereof, a process for producing the same, a pigment dispersion, a coloring composition, an inkjet recording ink, a coloring composition for color filter, and a color filter.

2. Description of the Related Art

In recent years, materials for forming color images have been particularly predominant as image recording materials. More specifically, inkjet system recording materials, thermal transfer system recording materials, electrographic system recording materials, transfer type silver halide photosensitive materials, printing inks, recording pens, and the like have been used actively. In image sensors such as CCDs for photographing equipment and in LCDs and PDPs for display, color filters are used for recording or reproducing a color image. In these color image recording materials or color filters, colorants (dyes or pigments) of three primary colors in a so-called additive color mixing process or subtractive color mixing process have been used in order to display or record full-color images. At present, however, there is no colorant having absorption characteristics capable of realizing a preferred color reproduction region and at the same time, having sufficient fastness to withstand various using conditions or environmental conditions. Thus, there is an eager demand for the improvement of it.

Dyes or pigments to be used for the above-described uses are required to have in common the following properties. Described specifically, they are required to have absorption characteristics preferable in view of color reproduction and have good fastness under the environmental conditions under which they are used, for example, light fastness, heat resistance, and fastness to an oxidizing gas such as ozone. In addition, when a colorant is a pigment, the pigment is further required to be substantially insoluble in water or an organic solvent, to have good fastness to chemicals, and not to lose preferable absorption characteristics in the molecularly dispersed state even if it is used as particles. Although the required properties described above can be controlled by adjusting the intensity of an intermolecular interaction, these two requirements are in a trade-off relation with each other, thus being difficult to satisfy both of them simultaneously.

In using a pigment as the colorant, the pigment is additionally required to have the following properties, that is, having a particle size and a particle shape necessary for realizing desired transparency, having good fastness under environmental conditions under which it is used, for example, good light fastness, heat resistance, and fastness to an oxidizing gas such as ozone, and also good fastness to organic solvents or chemicals such as a sulfurous acid gas, and being dispersed into fine particles in a used medium while keeping a stable dispersion state.

Compared with a dye required to have performances as colorant molecules, the pigment is required to have more performances. The pigment is required to satisfy not only performances as colorant molecules but all of the above-described requirements as a solid which is an aggregate of colorant molecules (a dispersion of fine particles). As a result, a group of compounds which can be used as pigments is severely limited, in comparison with dyes. Even when pigments are derived from high-performance dyes, only a few of the resulting pigments can satisfy the requirement for the performances as a dispersion of fine particles. Such pigments cannot be developed easily. This can be confirmed from the fact that the number of pigments registered in Color Index is below $1/10$ of the number of dyes.

Azo pigments are excellent in hue and tinctorial strength which are color characteristics so that they have widely been used in printing inks, inks for inkjet recording, and electrophotographic materials. Of these widely-used azo pigments, the most typically used ones are yellow diarylide pigments and red naphthol azo pigments. Examples of such diarylide pigments include C.I. Pigment Yellow 12, C.I. Pigment Yellow 13, and C.I. Pigment Yellow 17. Examples of the naphthol azo pigments include C.I. Pigment 208 and C.I. Pigment 242. These pigments are however inferior in fastness, particularly light fastness so that when a printed matter with them is exposed to light, they are decomposed, thus being not suited for long-term storage of the printed matter.

When a full color is expressed using three colors including yellow, magenta, and cyan or four colors including black in addition to these three colors in accordance with a subtractive color mixing process, the gray balance of a printed matter changes with the passage of time by using only one pigment inferior in fastness, or color reproducibility upon printing is deteriorated by using a pigment inferior in color characteristics. There is therefore a demand for a pigment and a pigment dispersion having both color characteristics and fastness in order to obtain a printed matter while keeping high color reproducibility for a long period of time.

JP-A-2010-47750 discloses an azo pigment excellent in color characteristics such as tinctorial strength and hue and at the same time excellent in durability such as light fastness.

Most of the typical organic pigments are polymorphic. Such pigments are known to have two or more crystal forms, though they have the same chemical composition.

Some of organic pigments, for example, azo pigments, can be provided in the form of finely granulated particles by selecting proper reaction conditions upon synthesis. For example, copper phthalocyanine green pigments are provided as a pigment by subjecting very fine and aggregated particles, which have been prepared upon synthesis, to grain growth and granulation in subsequent steps. Copper phthalocyanine blue pigments are provided as a pigment by subjecting coarse and uneven particles, which have been prepared upon synthesis, to miniaturization and granulation. For example, a diketopyrrolopyrrole pigment is usually synthesized by reacting a succinic diester with an aromatic nitrile in an organic solvent (refer to, for example, JP-A-58-210084). The crude diketopyrrolopyrrole pigment is heat treated in water or an organic solvent, followed by pulverization such as wet grinding into a form suited for use (refer to, for example, JP-A-5-222314). C.I. Pigment Red 254 is known to have α- and β-crystal forms (refer to, for example, JP-A-8-48908). Further, C.I. Pigment Yellow 181 which is an azo pigment is known to have several crystal forms (refer to, for example, US 2008/0058531).

SUMMARY

An object of the invention is to provide an azo compound, an azo pigment, an azo pigment dispersion, and a coloring composition excellent in color characteristics such as tinctorial strength, hue, and reproducibility and exhibiting heat resistance, light resistance, and high contrast.

Another object of the invention is to provide a coloring composition containing the azo pigment.

A further object of the invention is to provide a production process of an azo pigment capable of producing the azo pigment with good reproducibility at a high efficiency while controlling it to have specific structural isomerism and crystal polymorphism.

A still further object of the invention is to provide a coloring composition containing a dispersion of the azo pigment.

With the foregoing in view, the present inventors have carried out an intensive investigation. As a result, they have found that in the mode of the invention, azo pigments having a characteristic X-ray diffraction peak at a specific position exhibit markedly good color reproducibility, dispersibility, and storage stability of dispersions and have excellent color hue and tinctorial strength. They have also found that by using a coloring composition having the pigment dispersed therein, it is possible to provide an inkjet recording ink exhibiting excellent color reproducibility, good storage stability of dispersions, meaning that the particle size of the pigment is stable with the passage of time, and good ink liquid stability.

Further, they have found a production process of an azo pigment capable of producing the azo pigment with good reproducibility and at a high efficiency while controlling it to have specific structural isomerism and crystal polymorphism and have completed the invention.

<1> An azo pigment selected from the group consisting of: an azo pigment represented by the following formula (1), which has: a characteristic X-ray diffraction peak at Bragg angles (2θ±0.2°) of 6.9°, 21.5°, and 27.3° in CuKα characteristic X-ray diffraction, a peak height at 11.9° of 0.6 or less relative to a peak height at 10.9° or a tautomer thereof, or a salt, hydrate, or solvate of the azo pigment or tautomer thereof; and an azo pigment represented by the following formula (1), which has: a characteristic X-ray diffraction peak at Bragg angles (2θ±0.2°) of 6.9°, 25.8°, and 27.1° in CuKα characteristic X-ray diffraction, a peak height at 10.9° of 0.2 or less relative to a peak height at 11.9° or a tautomer thereof, or a salt, hydrate, or solvate of the azo pigment or tautomer thereof.

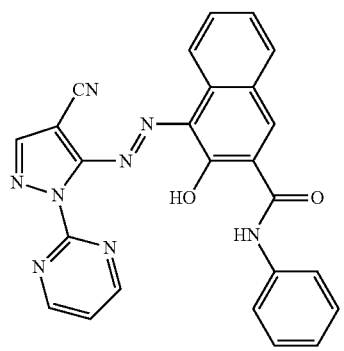

(1)

<2> A process for producing an azo pigment represented by the following formula (1) having a characteristic X-ray diffraction peak at Bragg angles (2θ±0.2°) of 6.9°, 21.5°, and 27.3° in CuKα characteristic X-ray diffraction and a peak height at 11.9° of 0.6 or less relative to a peak height at 10.9° or a tautomer thereof, having: effecting an azo coupling reaction between a diazonium salt derived from a heterocyclic amine represented by the following formula (2) and a compound represented by the following formula (3).

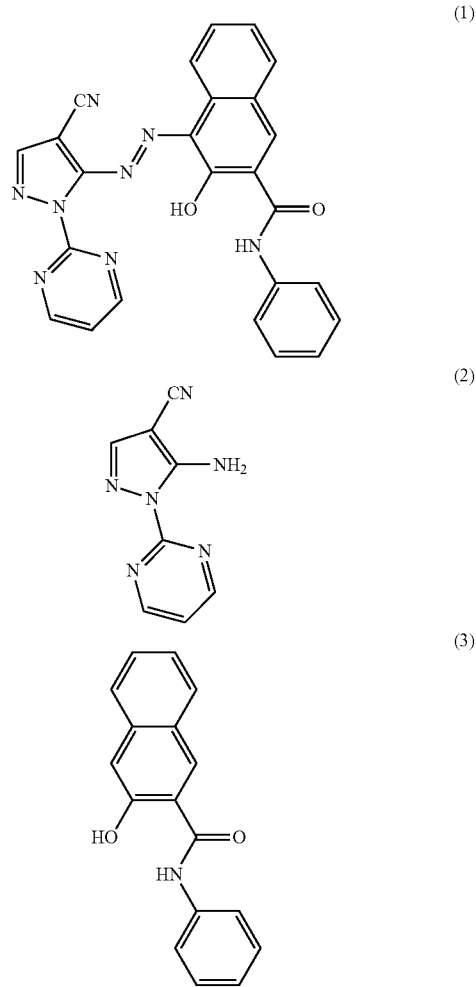

<3> The process for producing the azo pigment or tautomer thereof according to <2>, further having: drying the azo pigment to a water content of 0% or greater but less than 5%; and an after-treating.

<4> The process for producing the azo pigment or tautomer thereof according to <3>, wherein the after-treating is solvent heating treatment with a solvent having an SP value of from 7.0 to 14.0.

<5> The process for producing the azo pigment or tautomer thereof according to <2>, wherein the azo pigment has a characteristic X-ray diffraction peak at Bragg angles (2θ±0.2°) of 6.9°, 17.9°, 21.5°, and 27.3° in CuKα characteristic X-ray diffraction and a peak height at 11.9° of 0.6 or less relative to a peak height at 10.9°.

<6> A process for producing an azo pigment represented by the following formula (1) having a characteristic X-ray diffraction peak at Bragg angles (2θ±0.2°) of 6.9°, 25.8°, and 27.1° in CuKα characteristic X-ray diffraction and a peak height at 10.9° of 0.2 or less relative to a peak height at 11.9° or a tautomer thereof, having: effecting an azo coupling reaction between a diazonium salt derived from a heterocyclic amine represented by the following formula (2) and a compound represented by the following formula (3).

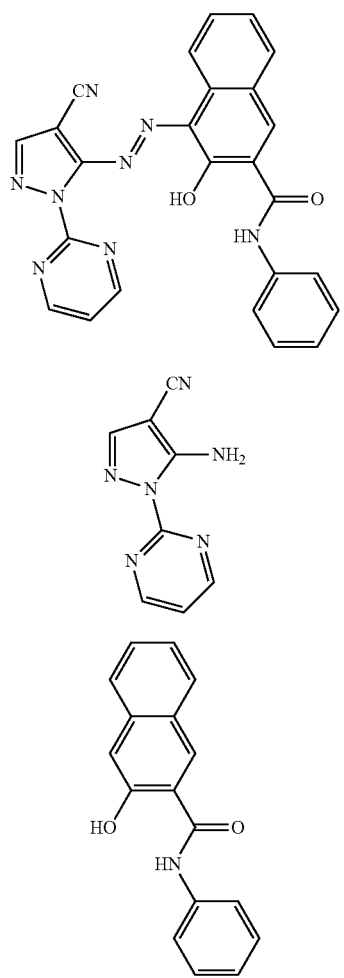

<7> The process for producing the azo pigment or tautomer thereof according to <6>, further having: after-treating a composition containing water and the azo pigment or tautomer thereof in a water content of 50 mass % or greater but not greater than 200 mass %.
<8> The process for producing the azo pigment or tautomer thereof according to <7>, wherein the after-treating is solvent heating treatment with a solvent having an SP value of from 7.0 to 14.0.
<9> The process for producing the azo pigment or tautomer thereof according to <6>, wherein the azo pigment has a characteristic X-ray diffraction peak at Bragg angles (2θ±0.2°) of 6.9°, 11.9°, 23.8°, 25.8°, 26.7°, and 27.1° in CuKα characteristic X-ray diffraction and a peak height at 10.9° of 0.2 or less relative to a peak height at 11.9°.
<10> An azo pigment or tautomer thereof obtained by the production process according to any one of <2>, or a salt, hydrate or solvate thereof.
<11> An azo pigment or tautomer thereof obtained by the production process according to any one of <6>, or a salt, hydrate or solvate thereof.
<12> A pigment dispersion having at least one selected from the group consisting of azo pigment, tautomer, salt, hydrate, or solvate according to <1>, <10>, and <11>.
<13> A coloring composition having the pigment dispersion according to <12>.
<14> An inkjet recording ink having the coloring composition according to <13>.
<15> A coloring composition for color filter, having the coloring composition according to <13>.
<16> A color filter produced by using the coloring composition for color filter according to <15>.

The invention provides an azo pigment excellent in color characteristics such as tinctorial strength, hue, and reproducibility and also excellent in storage stability of pigment dispersions, that is, stability of the particle size of the pigment even with the passage of time, and ink liquid stability. A pigment dispersion having excellent coloring characteristics, storage stability of dispersions, and ink liquid stability can be obtained by dispersing the pigment of the invention in various media. The pigment dispersion can be used, for example, as an ink for printing such as inkjet printing, a color toner for electrophotography, a display such as LCD or PDP, a color filter to be used in photographing equipment such as CCD, a paint, and a colored plastic.

DETAILED DESCRIPTION

Figure 1:
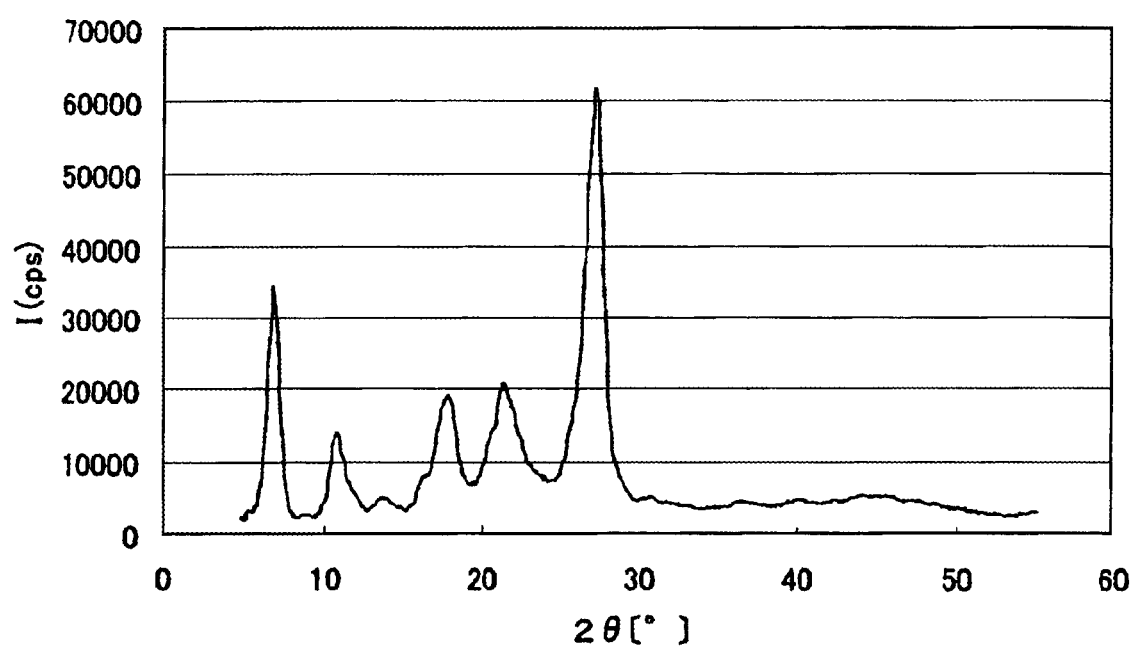
FIG. 1 is an X-ray diffraction pattern of an α crystal form pigment (1) synthesized according to Synthesis Example 1.

The invention will hereinafter be described specifically. The azo pigment or tautomer thereof may be a hydrate, solvent or salt thereof.

The present invention will hereinafter be described specifically.

The azo pigment of the invention is an azo pigment represented by the following formula (1) and having, in CuKα characteristic X-ray diffraction, a characteristic X-ray diffraction peak at Bragg angles (2θ±0.2°) of 6.9°, 17.9°, 21.5°, and 27.3° and a peak height of 0.6 or less at 11.9° relative to a peak height at 10.9°; or a tautomer thereof.

In this specification, the azo pigment represented by the following formula (1) and having, in CuKα characteristic X-ray diffraction, a characteristic X-ray diffraction peak at Bragg angles (2θ±0.2°) of 6.9°, 17.9°, 21.5°, and 27.3° and a peak height of 0.6 or less at 11.9° relative to a peak height at 10.9° will hereinafter be called "α crystal form azo pigment".

The azo pigment of the invention is also an azo pigment represented by the following formula (1) and having, in CuKα characteristic X-ray diffraction, a characteristic X-ray diffraction peak at Bragg angles (2θ±0.2°) of 6.9°, 25.8°, and 27.1° and a peak height of 0.2 or less at 10.9° relative to a peak height at 11.9°; or a tautomer thereof.

In this specification, the azo pigment represented by the following formula (1) and having, in CuKα characteristic X-ray diffraction, a characteristic X-ray diffraction peak at Bragg angles (2θ±0.2°) of 6.9°, 25.8°, and 27.1° and a peak height of 0.2 or less at 10.9° relative to a peak height at 11.9° will hereinafter be called "β crystal form azo pigment".

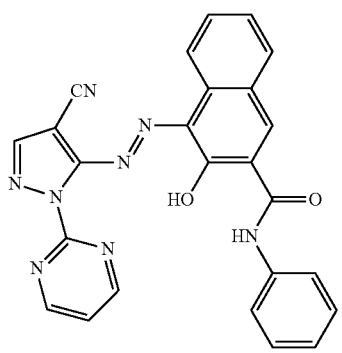

(1)

Pigments are in a state wherein colorant molecules constituting them are strongly connected to each other through aggregation energy produced by strong interaction between these molecules. It is described, for example, in The Imaging Society of Japan, 43, 10 (2004) that van der Waals force and intermolecular hydrogen bond are necessary for creating this state.

In order to enhance the intermolecular van der Waals force, introduction of an aromatic group, a polar group and/or a hetero atom into a molecule may be considered. And, in order to form an intermolecular hydrogen bond, introduction, into the molecule, of a substituent containing a hydrogen atom connected to a hetero atom and/or of an electron donating substituent may be considered. Further, the polarity of the entire molecule may preferably be higher. For these purposes, a linear group such as alkyl group is preferably shorter and the value of a molecular weight/azo group is preferably smaller.

From such a viewpoint, the pigment molecule preferably contains an amide bond, a sulfonamide bond, an ether bond, a sulfone group, an oxycarbonyl group, an imide group, a carbamoylamino group, a heterocyclic ring, a benzene ring or the like. The compound represented by the formula (1) can be used as an azo pigment because, due to its specific structure, it can easily form an intermolecular interaction between colorant molecules and has low solubility in water, an organic solvent, or the like.

Different from dyes that dissolve in water, an organic solvent, or the like in a molecule dispersed state, pigments are finely dispersed in a solvent as solid particles such as molecular aggregates.

In the invention, the X-ray diffraction measurement of the α crystal form azo pigment represented by the above formula (1) can be conducted by using a powder X-ray diffractometer "RINT2500" (trade name; product of Rigaku Corporation) in accordance with Japanese Industrial Standards JIS K0131 (General Rules for X-ray diffractometric analysis).

When a pigment has a single crystal form, the molecules exist densely and the intermolecular interaction becomes stronger, resulting in improvement in solvent resistance, thermal stability, light fastness, gas resistance, and printing density and moreover, widening of a color reproduction region. The azo pigment represented by the formula (1) or tautomer thereof has preferably a single crystal form having a characteristic X-ray diffraction peak at Bragg angles (2θ±0.2°) of 6.9°, 17.9°, 21.5°, and 27.3°, having a peak height of 0.6 or less at 11.9° relative to a peak height at 10.9°, and having no clear X-ray diffraction peak at 11.9°. It has more preferably a crystal form having a characteristic X-ray diffraction peak at 6.9°, 10.9°, 17.9°, 21.5°, and 27.3°.

Also, the azo pigment represented by the formula (1) or tautomer thereof has preferably a single crystal form having a characteristic X-ray diffraction peak at Bragg angles (2θ±0.2°) of 6.9°, 25.8°, and 27.1°, having a peak height of 0.2 or less at 10.9° relative to a peak height at 11.9°, and having no clear X-ray diffraction peak at 10.9°. It has more preferably a crystal form having a characteristic X-ray diffraction peak at 6.9°, 11.9°, 23.8°, 25.8°, 26.7°, and 27.1°.

The α crystal form azo pigment and β crystal form azo pigment which have a single crystal form can be obtained using the production process of the invention which will be described later.

Examples of the azo pigment represented by the formula (1) other than the α crystal form azo pigment and β crystal form azo pigment include a mixture of the α crystal form azo pigment and the β crystal form azo pigment. The α crystal form azo pigment has a hue with vivid reddish tint, and the β crystal form azo pigment has a hue with vivid yellowish tint. On the other hand, the mixture of the α crystal form azo pigment and the β crystal form azo pigment has excellent dispersibility.

In the α crystal form azo pigment of the present invention, assuming that the peak height at a Bragg angle (2θ±0.2°) of 10.9° in the CuKα characteristic X-ray diffraction is 1, the peak height at 11.9° is preferably 0.6 or less because it may prevent the pigment from having a hue with yellowish tint.

Assuming that the peak height at a Bragg angle (2θ±0.2°) of 10.9° is 1 in the CuKα characteristic X-ray diffraction, the peak height at a Bragg angle (2θ±0.2°) of 11.9° is therefore from 0 to 0.6, preferably from 0 to 0.5, more preferably from 0 to 0.4. This means that a single crystal form having no clear X-ray diffraction peak at 11.9° is preferred.

In the β crystal form azo pigment of the present invention, assuming that the peak height at a Bragg angle (2θ±0.2°) of 11.9° in the CuKα characteristic X-ray diffraction is 1, the peak height at 10.9° is preferably 0.2 or less because it may prevent the pigment from having a hue with yellowish tint.

Assuming that the peak height at a Bragg angle (2θ±0.2°) of 11.9° is 1 in the CuKα characteristic X-ray diffraction, the peak height at a Bragg angle (2θ±0.2°) of 10.9° is therefore from 0 to 0.6, preferably from 0 to 0.5, more preferably from 0 to 0.4. This means that a single crystal form having no clear X-ray diffraction peak at 10.9° is preferred.

The primary particles of the α crystal form azo pigment and the β crystal form azo pigment represented by the formula (1) preferably have, as observed by a transmission microscope, a length in the long axis direction of 0.01 μm or greater but not greater than 30 μm, more preferably 0.02 μm or greater but not greater than to 10 μm, particularly preferably 0.03 μm or greater but not greater than 0.5 μm.

When the length in the long axis direction of the primary particle as observed by a transmission microscope is 0.01 μm or greater, fastness to light or ozone and dispersibility of the particles in a pigment can be achieved more definitely. Length in the long axis direction of 30 μm or less, on the other hand, prevents overdispersion of the particles when they are dispersed into a desired volume average particle size and also prevents aggregation of them so that the storage stability of the pigment dispersion can be achieved more definitely.

The length of the primary particles in the long axis direction falling within the above-described range is therefore preferred because fastness to light or ozone is high and the dispersion of such pigment particles has excellent storage stability.

The volume average particle size of the pigment dispersion containing the pigment composition of the present invention can be measured using a Nanotrac UPA particle size analyzer ("UPA-EX150", trade name; product of Nikkiso Co., Ltd.). The measurement is performed according to a predetermined measurement method after placing 3 ml of the pigment dispersion in the measurement cell. As a parameter to be input at the measurement, an ink viscosity can be used as the viscosity and a pigment density can be used as the density of dispersed particles.

As described above, the azo pigment of the invention has a specific structure and at the same time, has a characteristic X-ray diffraction peak at a specific position so that it exhibits excellent characteristics in color characteristics such as tinctorial strength, hue, and reproducibility and also excellent characteristics in fastness (particularly, solvent resistance).

The invention also embraces tautomers of the azo pigment represented by the formula (1). The formula (1) is the canonical formula of several tautomers which are possible from the standpoint of the chemical structure. Tautomers having a structure other than that described above or mixtures containing a plurality of tautomers can also be used.

For example, azo-hydrazone represented by the formula (1') can be considered as a tautomer of the pigment represented by the formula (1).

The invention embraces the compound represented by the formula (1') which is a tautomer of the azo pigment represented by the formula (1).

A ratio of azo to hydrazone can easily be found half stoichiometrically by using solid NMR measurement or Raman absorption measurement. Both azo and hydrazone exhibit good performance, but a ratio of hydrazone is preferably greater than that of azo from the standpoint of hue. A ratio of hydrazone is preferably 50% or greater, more preferably 80% or greater, most preferably 90% or greater.

good absorption characteristics of a red pigment and are suited for fields requiring color reproducibility such as photo and CF applications.

[Production Process of Azo Pigment or Tautomer Thereof]

A production process of an azo pigment or tautomer thereof according to the invention is a process for producing an azo pigment represented by the below-described formula (1) or a tautomer thereof, which includes a step of carrying out an azo coupling reaction between a diazonium salt derived from a heterocyclic amine represented by the below-described formula (2) amine and a compound represented by the below-described formula (3). This production process can produce the azo pigment represented by the formula (1) (especially, an α crystal form azo pigment and a β crystal form azo pigment) or tautomer thereof at a high efficiency with good reproducibility. In the production process of the present invention, the azo pigment represented by the formula (1) has preferably, in CuKα X-ray diffraction, a characteristic X-ray diffraction peak at Bragg angles (2θ±0.2°) of 6.9°, 17.9°, 21.5°, and 27.3° and a peak height at 11.9° of 0.6 or less relative to a peak height at 10.9°, or in CuKα characteristic X-ray diffraction, a characteristic X-ray diffraction peak at Bragg angles (2θ±0.2°) of 6.9°, 25.8°, and 27.1°, having a peak height of 0.2 or less at 10.9° relative to a peak height at 11.9°

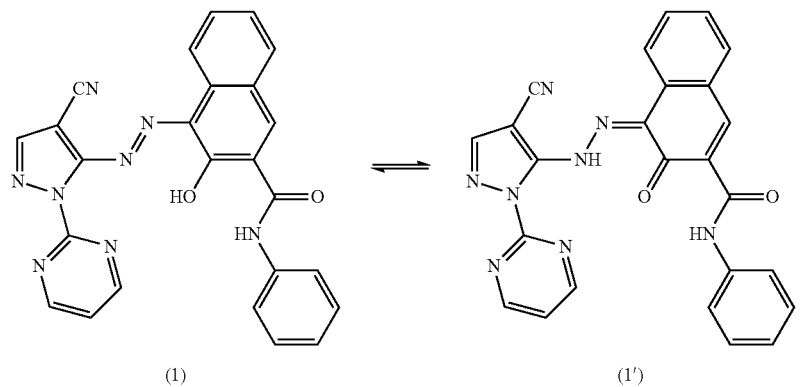

(1)                            (1')

The α crystal form azo pigment represented by the formula (1) and having, in CuKα characteristic X-ray diffraction, a characteristic X-ray diffraction peak at Bragg angles (2θ±0.2°) of 6.9°, 17.9°, 21.5°, and 27.3° and a peak height of 0.6 or less at 11.9° relative to a peak height at 10.9° features good absorption characteristics of a red pigment and are suited for fields requiring color reproducibility such as photo and CF applications.

The β crystal form azo pigment represented by the formula (1) and having, in CuKα characteristic X-ray diffraction, a characteristic X-ray diffraction peak at Bragg angles (2θ±0.2°) of 6.9°, 25.8°, and 27.1°, having a peak height of 0.2 or less at 10.9° relative to a peak height at 11.9° features

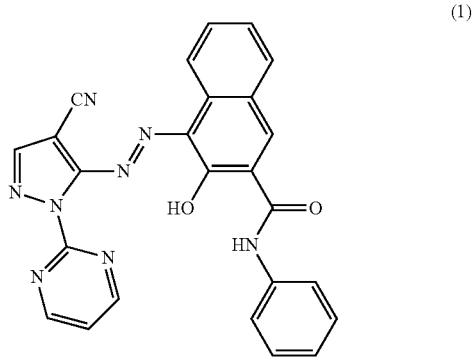

(1)

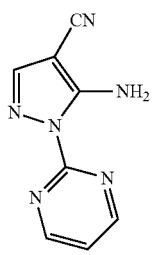

(2)

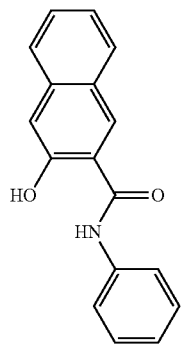

(3)

Preparation of the diazonium salt and the coupling reaction between the diazonium salt and the compound represented by the formula (3) can be conducted in a conventional manner.

Preparation of the diazonium salt from the heterocyclic amine represented by the formula (2) can be performed using a conventional preparation process of a diazonium salt which uses a nitrosonium ion source such as nitrous acid, a nitrite, or nitrosyl sulfuric acid in a reaction medium containing an acid (for example, hydrochloric acid, sulfuric acid, phosphoric acid, acetic acid, propionic acid, methanesulfonic acid, or trifluoromethanesulfonic acid).

More preferred examples of the acid include acetic acid, propionic acid, methanesulfonic acid, phosphoric acid, and sulfuric acid. They may be used either singly or in combination. Among them, single use of phosphoric acid, combined use of acetic acid and sulfuric acid, combined use of acetic acid and propionic acid, and combined use of acetic acid, propionic acid, and sulfuric acid are more preferred, with single use of phosphoric acid being particularly preferred.

As the reaction medium (solvent), organic acids and inorganic acids are preferred. Particularly, phosphoric acid, sulfuric acid, acetic acid, propionic acid, and methanesulfonic acid are preferred. Of these, phosphoric acid is preferred.

Preferred examples of the nitrosonium ion source include nitrite esters, nitrite salts, and nitrosyl sulfuric acid. Of these, sodium nitrite, potassium nitrite, isoamyl nitrite, and nitrosyl sulfuric acid (for example, an $ONHSOP_4$ sulfuric acid solution) are preferred. Particularly, using sodium nitrite enables stable and efficient preparation of the diazonium salt. Upon preparation, a proper amount of a trap agent (for example, urea) for trapping an excess amount of a substance (for example, nitrosonium ions) derived from sodium nitrite may be added. This makes it possible to suppress generation of impurities derived from the excess amount of a substance.

The solvent is used in an amount of preferably from 0.5 to 50 times the mass, more preferably from 1 to 20 times the mass, especially preferably from 3 to 15 times the mass of the heterocyclic amine represented by the formula (2).

In the invention, the heterocyclic amine of the formula (2) may be dispersed in the solvent or, depending on the kind of the diazo component, may be dissolved in the solvent. The latter is preferred.

The amount of the nitrosonium ion source is preferably from 0.95 to 5.0 equivalents, more preferably from 1.00 to 3.00 equivalents, especially preferably from 1.00 to 1.50 equivalents based on the heterocyclic amine of the formula (2).

The reaction temperature is preferably from −15 to 40° C., more preferably from −10 to 35° C., still more preferably from −5 to 30° C. Reaction temperatures less than −15° C. are not economical because the reaction rate markedly decreases and it takes considerably long hours for synthesis. Reaction temperatures exceeding 40° are, on the other hand, not preferred because a generation amount of a by-product increases.

The reaction time is preferably from 30 minutes to 300 minutes, more preferably from 30 minutes to 200 minutes, still more preferably from 30 minutes to 150 minutes.

The compound represented by the formula (3) may be commercially available but can be prepared based on the process described in Japanese Patent Laid-Open No. 2008-13472.

[Coupling Reaction Step]

The coupling reaction step can be conducted in reaction media from an acidic one to a basic one. For the azo pigment of the invention, however, the coupling reaction step is conducted preferably in reaction media from an acidic one to a neutral one, because such reaction media can suppress decomposition of the diazonium salt and provide an azo pigment with good efficiency.

Preferred examples of the reaction medium (solvent) include organic acids, inorganic acids, and organic solvents, with organic solvents being particularly preferred. Solvents not causing a liquid separation phenomenon and forming a uniform solution are preferred. Examples thereof include alcoholic organic solvents such as methanol, ethanol, propanol, isopropanol, butanol, t-butyl alcohol, and amyl alcohol; ketone-based organic solvents such as acetone and methyl ethyl ketone; diol-based organic solvents such as ethylene glycol, diethylene glycol, triethylene glycol, propylene glycol, dipropylene glycol, and 1,3-propanediol; ether-based organic solvents such as ethylene glycol monomethyl ether, ethylene glycol monoethyl ether, and ethylene glycol diethyl ether; tetrahydrofuran; dioxane; and acetonitrile. These solvents may be a mixture of two or more thereof.

Organic solvents having a polarity parameter (ET) of 40 or greater are preferred. Of these, glycol-based solvents having in the molecule thereof two or more hydroxyl groups, alcoholic solvents having 3 or less carbon atoms, and ketone-based solvents having 5 or less carbon atoms in total are more preferred, with alcoholic solvents having 2 or less carbon atoms (for example, methanol and ethylene glycol) and ketone-based solvents having 4 or less carbon atoms in total (for example, acetone and methyl ethyl ketone) being still more preferred. Mixed solvents thereof are also included.

Polar aprotic solvents are also preferred as the reaction medium. Examples of the polar aprotic solvents include N,N-dimethylformamide, N,N-dimethylacetamide, N-methyl-2-pyrrolidone, dimethylsulfoxide, tetramethylurea, acetone, methyl ethyl ketone, and acetonitrile and mixed solvents thereof. Of these solvents, acetone, methyl ethyl ketone, N,N-dimethylacetamide, and acetonitrile are particularly preferred. When these solvents are used, the compound of the formula (3) may be dissolved in the solvent either completely or incompletely.

The reaction media exemplified above may contain an acid-containing reaction medium to be used for induction of the heterocyclic amine represented by the formula (2) into the corresponding diazonium salt.

The using amount of the solvent is preferably from 1 to 100 times the mass, more preferably from 1 to 50 times the mass, still more preferably from 2 to 30 times the mass of the compound represented by the formula (3).

In the invention, the compound represented by the formula (3) may be either dispersed in the solvent or dissolved in the solvent.

The using amount of the compound represented by the formula (3) is preferably from 0.5 to 5.0 equivalents, more preferably from 0.6 to 3.00 equivalents, particularly preferably from 0.6 to 1.5 equivalents based on the diazonium salt.

The reaction temperature is preferably from −30° C. to 30° C., more preferably from −20° C. to 20° C., still more preferably from −10° C. to 10° C. Reaction temperatures less than −30° C. are not economical because they markedly decrease the reaction rate and time necessary for the synthesis increases seriously. Synthesis at high temperatures exceeding 30° C. increases a generation amount of by-products. Temperatures outside the above range are therefore not preferred.

The reaction time is preferably from 30 minutes to 300 minutes, more preferably from 30 minutes to 250 minutes, still more preferably from 30 minutes to 200 minutes.

In the synthesis process of the azo pigment or tautomer thereof in the invention, the product (crude azo pigment) obtained by these reactions may be provided for use after being treated according to an after-treating method of conventional organic synthesis reactions and then being optionally purified.

More specifically, the product isolated from the reaction system may be provided for use without purification or after purification using purifying operations such as recrystallization and salt formation either singly or in combination.

Also, the reaction product may be provided for use after distilling off or not distilling off the reaction solvent after completion of the reaction, pouring the residue or the product in water or ice, neutralizing or not neutralizing the mixture, and not purifying or purifying the isolated product or extract with an organic solvent/water solution by using purifying operations such as recrystallization, crystallization, and salt formation either singly or in combination.

The synthesis process of the azo pigment or tautomer thereof according to the invention will next be described more specifically.

In the process for producing the azo pigment or tautomer thereof according to the invention, it is preferred to carry out a coupling reaction between a diazonium compound obtained by diazotizing a heterocyclic amine represented by the formula (2) and a compound represented by the formula (3) after dissolving the compound of formula (3) in an organic solvent.

The diazotization reaction of the heterocyclic amine represented by the formula (2) can be conducted, for example, by reacting the amine with a reagent such as sodium nitrite or nitrosylsulfuric acid in an acidic solvent such as sulfuric acid, phosphoric acid, or acetic acid at a temperature of 30° C. or less for a period of from about 10 minutes to about 6 hours. The coupling reaction is conducted preferably by reacting the diazonium salt obtained by the above-described process with the compound represented by the formula (3) at 40° C. or less, preferably 15° C. or less for a period of from about 10 minutes to about 12 hours.

As a production process of an azo pigment, it is preferred to use, for example, the process of the invention in which a coupling reaction is performed after dissolving the compound represented by the formula (3) in an organic solvent. Examples of the organic solvent usable here include alcoholic solvents, ketone-based solvents, and polar aprotic solvents. Preferred examples of the alcoholic solvents include methanol, ethanol, isopropanol, ethylene glycol, and diethylene glycol, with methanol being particularly preferred. Preferred examples of the ketone-based solvents include acetone, methyl ethyl ketone, and cyclohexanone, with acetone being particularly preferred. Preferred examples of the polar aprotic solvents include, in addition to acetone and methyl ethyl ketone exemplified above as the ketone-based solvents, N,N-dimethylformamide, N,N-dimethylacetamide, N-methyl-2-pyrrolidone, dimethylsulfoxide, tetramethylurea, and acetonitrile, with N,N-dimethylacetamide being particularly preferred.

Among the above-described production processes of the azo pigment or tautomer thereof, it is particularly preferred to use, as the heterocyclic amine represented by the formula (2), a solution obtained by dissolving the heterocyclic amine in phosphoric acid, prepare a solution of a diazonium salt derived from the heterocyclic amine, and then mixing the solution of the diazonium salt with a solution obtained by dissolving the compound represented by the formula (3) in N,N-dimethylacetamide to effect the azo coupling reaction.

In the above preferred mode, the reaction medium used in the coupling reaction step contains, in addition to N,N-dimethylacetamide, phosphoric acid as the acid-containing reaction medium used for diazotization of the heterocyclic amine represented by the formula (2).

Phosphoric acid used for conversion of the heterocyclic amine represented by the formula (2) into the resulting diazonium salt functions both as an acid and a reaction medium in the acid-containing reaction medium.

The compound obtained by the above-described production process may be provided for a purification step. In the purification step, pH adjustment with a base is not inevitable. When pH adjustment is performed, pH is adjusted preferably to from 4 to 10. Of them, a pH of from 5 to 8 is more preferred, with a pH of from 5.5 to 7.5 being particularly preferred.

When the compound has a pH of 10 or less, it does not have a hue with yellowish tint so that such a pH is preferred from the standpoint of hue. When the compound has a pH of 4 or greater and it is used, for example, as an inkjet recording ink, it does not cause problems such as corrosion of a nozzle so that such a pH is preferred.

In the production process according to the invention, the compound of the formula (1) is preferably subjected to a drying step and an after treating step in order to obtain an α crystal form azo pigment with high purity; more preferably subjected to a drying step for drying the azo pigment represented by the formula (1) or tautomer thereof until its water content is reduced to 0% or greater but less than 5% and then an after-treating step. By these steps, derivation into a β crystal form azo pigment, which will otherwise occur due to the presence of water in the after-treating step, can be controlled, making it possible to obtain an α crystal form azo pigment with high purity.

On the other hand, in the production process according to the invention, the composition containing water and the azo pigment represented by the formula (1) or tautomer thereof having a water content of 50 mass % or greater but not greater than 200 mass % is preferably subjected to an after-treating step in order to obtain a β crystal form azo pigment with high purity. In short, the compound of the formula (1) is preferably subjected to an after-treating step in the presence of water in order to obtain a β crystal form azo pigment with high purity.

[Drying Step]

In the production process of the invention, the compound of the formula (1) may be provided for a drying step if necessary. By subjecting the compound of the formula (1) to an after-treating step after a drying step, the production of an α crystal form azo pigment at high purity.

The compound represented by the formula (1) is preferably a compound obtained by, before subjecting to solvent heating treatment after the azo coupling reaction, neutralizing powders obtained by filtration or the like and then drying them. This operation enables to prepare an α crystal form azo pigment with better reproducibility at a higher efficiency. The drying step here is a step of drying, after neutralization, the compound represented by the formula (1) to reduce the water content thereof to less than 5%.

The water content is preferably 0% or greater but less than 10%, more preferably 0% or greater but less than 5%, particularly preferably 0% or greater but less than 1%. As the water content is smaller, the amount of the solvent used for the heating treatment can be made smaller.

[After-Treating Step]

The compound represented by the formula (1) in the invention is preferably subjected to solvent heating treatment as an after-treating step.

In the invention, the after-treating step preferably includes solvent heating treatment with a solvent having an SP value of from 7.0 to 14.0. Since a certain portion of the pigment is dissolved by this solvent heating treatment, impurities incorporated in the pigment can be removed.

As the solvent to be used for solvent heating treatment, solvents having an SP value of from 7.0 to 1.40 are preferred; solvents having an SP value of from 9.0 to 13.0 are more preferred; ethyl acetate, dibutyl phthalate, acetone, isopropyl alcohol, acetonitrile, acetic acid, N,N-dimethylacetamide, and N,N-dimethylformamide are still more preferred; and acetone, acetone, acetonitrile, N,N-dimethylacetamide, and N,N-dimethylformamide are most preferred.

Although the amount of the solvent to be used for the solvent heating treatment differs, depending on the kind of the solvent, it is preferably from 1 to 100 times the weight, more preferably from 5 to 70 times the weight, particularly preferably from 5 to 30 times the weight of the compound represented by the formula (1).

The solvent exemplified above may further contain an inorganic or organic acid or a base. The temperature of the solvent heating treatment differs, depending on the primary particle size of a desired pigment. It is preferably from 40 to 150° C., more preferably from 60 to 100° C. The treating time is preferably from 30 minutes to 24 hours.

The above-described tautomerism or polymorphism can be controlled by the production conditions upon after treatment. Examples of the method include pigment particle size controlling step by milling treatment such as solvent salt milling, salt milling, dry milling, solvent milling, or acid pasting, or by solvent heating treatment; and surface treating step with a resin, a surfactant, a dispersant, or the like.

The solvent salt milling is performed, for example, by charging a crude azo pigment, an inorganic salt, and an organic solvent which does not dissolve it therein in a kneader and knead-milling of the mixture in the kneader. As the inorganic salt, water-soluble inorganic salts can preferably be used. For example, using inorganic salts such as sodium chloride, potassium chloride, and sodium sulfate is preferred. Using inorganic salts having an average particle size of from 0.5 to 50 μm is more preferred. The using amount of the inorganic salt is preferably a 3 to 20 times the mass, more preferably from 5 to 15 times the mass of the crude azo pigment. As the organic solvent, water-soluble organic solvents can preferably be used. Since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy) ethanol, 2-(hexyloxy)ethanol, diethylene glycol monomethyl ether, diethylene glycol monoethyl ether; diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, and dipropylene glycol, and mixtures thereof. The using amount of the water-soluble organic solvent is preferably from 0.1 to 5 times the mass of the crude azo pigment. The kneading temperature is preferably from 20 to 130° C., particularly preferably from 40 to 110° C. As the kneader, for example, a kneader or a mix muller can be used.

[After-treating Step in the Presence of Water]

In order to obtain the production of an β crystal form azo pigment at high purity, the composition containing water and the azo pigment represented by the formula (1) or tautomer thereof having a water content of 50 mass % or greater but not greater than 200 mass % is preferably subjected to an after-treating step. In short, the compound of the formula (1) is preferably subjected to an after-treating step in the presence of water. This makes it possible to prepare the β crystal form azo pigment with better reproducibility at a higher efficiency. The water content can be determined by placing on an aluminum dish 100 mg of a pigment to be measured and leaving it to stand overnight at 80° C., subtracting the mass (g) of the pigment thus evaporated to dryness from the total mass (100 mg) of the pigment before evaporation to dryness, and calculating a percentage (mass %) of the difference in the total mass (100 mg) of the pigment before evaporation to dryness.

As the after-treating step, the above-described solvent heating treatment is preferred.

The compound represented by the formula (1) to be subjected to the solvent heating treatment is preferably a compound in the presence of water obtained by neutralizing the powder collected by filtration after the azo coupling reaction and then filtering the powder.

The water content of the compound represented by the formula (1) when the after-treating step is performed in the presence of water is preferably 20 mass % or greater but not greater than 400 mass %, more preferably 50 mass % or greater but not greater than 200 mass %, particularly preferably 100 mass % or greater but not greater than 200 mass %. Water contents adjusted to 20 mass % or greater facilitate preparation of the β crystal form azo pigment not containing the α crystal form azo pigment. Contents adjusted to not greater than 400 mass %, on the other hand, make it possible to obtain the β crystal form azo pigment with a uniform structure in a short period of time.

The invention also relates to the α crystal form azo pigment produced using the above production process or a tautomer thereof, and a salt, hydrate or solvate thereof and the β crystal form azo pigment produced using the above production process or a tautomer thereof, and a salt, hydrate or solvate thereof.

[Pigment Dispersion]

The pigment dispersion of the invention is characterized in that it contains at least one selected from the above-described α crystal form azo pigment or tautomer thereof, or the azo pigment obtained by the production process of the present invention or tautomer thereof. A pigment dispersion containing it can be equipped with excellent color characteristics, durability, and dispersion stability.

The pigment dispersion of the invention may be aqueous or non-aqueous, but is preferably an aqueous pigment dispersion. In the aqueous pigment dispersion of the invention, an aqueous liquid for dispersing therein the pigment may be a mixture having water as a main component and, as needed, a hydrophilic organic solvent.

Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrrolidone; 2-oxazolidone; 1,3-dimethyl-2-imidazolidinone; acetonitrile; and acetone.

The aqueous pigment dispersion of the invention may further contain a water-based resin. Examples of the water-based resin include water-soluble resins which can be dissolved in water, water-dispersible resins which can be dispersed in water, and colloidal dispersion resins, and mixtures thereof. Specific examples of the water-based resins include acrylic resins, styrene-acrylic resins, polyester resins, polyamide resins, polyurethane resins, and fluorine-containing resins.

When the aqueous pigment dispersion of the invention contains the water-based resin, no particular limitation is imposed on its content. For example, the content may be from 0 to 100 mass % relative to the pigment.

Further, in order to improve dispersibility of the pigment and quality of images, a surfactant and a dispersant may be used. Examples of the surfactant include anionic, nonionic, cationic, and amphoteric surfactants. Any of them may be used, but anionic or nonionic surfactants are preferred.

When the aqueous pigment dispersion of the invention contains a surfactant, no particular limitation is imposed on its content. For example, the content may be from 0 to 100 mass % relative to the pigment.

Examples of the anionic surfactant include fatty acid salts, alkyl sulfates, alkylbenzene sulfonates, alkyl naphthalene sulfonates, dialkyl sulfosuccinates, alkyl diaryl ether disulfonatets, alkyl phosphates, polyoxyethylene alkyl ether sulfates, polyoxyethylene alkylaryl ether sulfates, naphthalenesulfonic acid-formalin condensates, polyoxyethylene alkyl phosphates, glycerol borate fatty acid esters, and polyoxyethylene glycerol fatty acid esters.

Examples of the nonionic surfactant include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkyl amines, fluorine-containing surfactants, and silicon-containing surfactants.

The non-aqueous pigment dispersion of the invention is obtained by dispersing the pigment represented by the formula (1) in a non-aqueous vehicle. Examples of a resin to be used as the non-aqueous vehicle include petroleum resin, casein, shellac, rosin-modified maleic acid resin, rosin-modified phenolic resin, nitrocellulose, cellulose acetate butyrate, cyclized rubber, chlorinated rubber, oxidized rubber, rubber hydrochloride, phenolic resin, alkyd resin, polyester resin, unsaturated polyester resin, amino resin, epoxy resin, vinyl resin, vinyl chloride, vinyl chloride-vinyl acetate copolymer, acrylic resin, methacrylic resin, polyurethane resin, silicone resin, fluorine resin, drying oil, synthetic drying oil, styrene/maleic acid resin, styrene/acrylic resin, polyamide resin, polyimide resin, benzoguanamine resin, melamine resin, urea resin, chlorinated polypropylene, butyral resin, and vinylidene chloride resin. As the non-aqueous vehicle, a photo-curable resin may be used.

Examples of the solvent to be used in the non-aqueous vehicles include aromatic solvents such as toluene, xylene, and methoxybenzene; acetates solvents such as ethyl acetate, butyl acetate, propylene glycol monomethyl ether acetate, and propylene glycol monoethyl ether acetate; propionate solvents such as ethoxyethyl propionate; alcoholic solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen-compound containing solvents such as N,N-dimethylformamide, γ-butyrolactam, N-methyl-2-pyrrolidone, aniline, and pyridine; lactone solvents such as γ-butyrolactone; and carbamates such as a 48:52 mixture of methyl carbamate and ethyl carbamate.

In the invention, the volume-average particle size of the pigment is preferably 10 nm or greater but not greater than 250 nm. The term "volume-average particle size of the pigment" means the particle size of the pigment itself or the entire size of the particle and an additive when the additive such as a dispersant has been adhered to the pigment. In the invention, as an apparatus for measuring the volume-average particle size of the pigment, a Nanotrac UPA particle size analyzer ("UPA-EX150", trade name; product of Nikkiso Co., Ltd.) can be used. The measurement is conducted according to a predetermined measuring method after placing 3 ml of a pigment dispersion in a measuring cell. With respect to parameters to be inputted upon measurement, an ink viscosity is used as the viscosity and a pigment density is used as the density of the dispersed particles.

The volume-average particle size is more preferably 20 nm or greater but not greater than 250 nm, still more preferably 30 nm or greater but not greater than 230 nm. When the volume-average particle size of the particles in the pigment dispersion is less than 20 nm, storage stability cannot always be ensured. When it exceeds 250 nm, on the other hand, an optical density may decrease.

The concentration of the pigment contained in the pigment dispersion of the invention is preferably in a range of from 1 to 35 mass %, more preferably in a range of from 2 to 25 mass %. Concentrations less than 1 mass % cannot always provide a sufficient image density when the pigment dispersion is used singly as an ink. Concentrations exceeding 35 mass %, on the other hand, may deteriorate the dispersion stability.

The pigment dispersion of the invention can be obtained by dispersing the azo pigment and the aqueous or non-aqueous medium through a dispersing apparatus. Examples of the dispersing apparatus usable here include a simple stirrer, an impeller-stirring system, an in-line stirring system, a mill system (for example, colloid mill, ball mill, sand mill, bead mill, attritor, roll mill, jet mill, paint shaker, or agitator mill), a ultrasonic system, a high-pressure emulsion dispersion system (high-pressure homogenizer; specific commercially available apparatuses being Gaulin homogenizer, a microfluidizer, and DeBEE2000).

The azo pigments of the invention can be used as image recording materials for forming images, particularly color images. Specific examples of the image recording materials include, as well as inkjet recording materials which will be described in detail later, heat sensitive recording materials, pressure sensitive recording materials, recording materials using an electrophotographic system, transfer system silver halide photosensitive materials, printing inks, and recording pens, preferably inkjet system recording materials, heat-sensitive recording materials, and recording materials using an electrophotographic system, more preferably inkjet recording materials.

In addition, the pigments can be used for color filters for recording and reproducing color images to be used in solid state imaging devices such as CCDs and in displays such as LCD and PDP and a dye solution for dyeing various fibers therewith.

The azo pigment of the invention may be used after adjusting, with a substituent, its physical properties such as solvent resistance, dispersibility, and thermal transfer property suited for its application. The azo pigment of the invention may be used in an emulsion dispersion state or in a solid dispersion state according to the system wherein it is used.

[Coloring Composition]

The coloring composition of the invention means a coloring composition containing the above-described azo pigment or tautomer thereof or the above-described pigment dispersion. The coloring composition of the invention may contain a medium. The coloring composition using a solvent as the medium is particularly suited as an inkjet recording ink. The coloring composition of the invention can be prepared by using an oleophilic medium or a water-based medium as the medium and dispersing the azo pigment of the invention in the medium. Preferred is the coloring composition using the water-based medium. The coloring composition of the invention embraces a composition for ink excluding the medium. The coloring composition of the invention may contain, as needed, other additives without damaging the advantages of the invention. Examples of the other additives include known additives (described in Japanese Patent Laid-Open No 2003-306623) such as drying preventives (wetting agents), antifading agents, emulsion stabilizers, penetration accelerators, ultraviolet absorbers, antiseptics, antifungal agents, pH regulators, surface tension regulators, anti-foaming agents, viscosity regulators, dispersants, dispersion stabilizers, rust inhibitors, and chelating agents. For water-soluble inks, these various additives are added directly to the ink liquid. For oil-soluble inks, it is the common practice to add them to a dispersion of the azo pigment prepared in advance, but they may be added to an oil phase or an aqueous phase upon preparation.

[Inkjet Recording Ink]

Next, the inkjet recording ink of the invention will be described below.

For the inkjet recording ink of the invention (which may also be called "the ink"), the pigment dispersion described above is employed. The ink is prepared preferably by mixing with a water-soluble solvent, water, or the like. When there is no particular problem, the pigment dispersion of the invention may be used as is.

In consideration of hue, color density, saturation, and transparency of an image formed on a recording medium, the content of the pigment dispersion in the ink of the invention is in a range of preferably from 1 to 100 mass %, particularly preferably from 3 to 20 mass %, most preferably from 3 to 10 mass %.

In 100 parts by mass of the ink of the invention, the pigment of the invention is contained in an amount of preferably 0.1 part by mass or greater but not greater than 20 parts by mass, more preferably 0.2 part by mass or greater but not greater than 10 parts by mass, still more preferably 1 part by mass or greater but not greater than 10 parts by mass. The ink of the invention may further contain another pigment in combination with the pigment of the invention. When two or more pigments are used in combination, the total amount of the pigments is preferably within the above-described range.

The ink of the invention can be used for forming not only a mono-color image but also a full-color image. In order to form the full-color image, a magenta tone ink, a cyan tone ink, and a yellow tone ink can be used and, further, a black tone ink may be used for adjusting the tone.

Further, the ink of the invention may contain another pigment simultaneously with the azo pigment of the invention. Examples of yellow pigments usable here include C.I.P.Y. 74, C.I.P.Y. 128, C.I.P.Y. 155, and C.I.P.Y. 213. Examples of magenta pigments usable here include C.I.P.V. 19 and C.I.P.R. 122. Examples of cyan pigments usable here include C.I.P.B. 15:3 and C.I.P.B. 15:4. In addition to these pigments, any pigment may be used as each of the pigments. Examples of a black color material usable here include disazo, trisazo, and tetrazo pigments and also a dispersion of carbon black.

As the water-soluble solvents to be used in the inkjet recording ink of the invention, polyhydric alcohols, polyhydric alcohol derivatives, nitrogen-containing solvents, alcohols, and sulfur-containing solvents are used. Specific examples of the polyhydric alcohols include ethylene glycol, diethylene glycol, propylene glycol, butylene glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Examples of the nitrogen-containing solvents include pyrrolidone, N-methyl-2-pyrrolidone, cyclohexylpyrrolidone, and triethanolamine. Examples of the alcohols include ethanol, isopropyl alcohol, butyl alcohol, and benzyl alcohol. Examples of the sulfur-containing solvents include thiodiethanol, thiodiglycerol, sulfolane, and dimethylsulfoxide.

In addition, propylene carbonate and ethylene carbonate may also be used.

The water-soluble solvents to be used in the invention may be used either singly or in combination. The content of the water-soluble solvent in the entire ink is 1 mass % or greater but not greater than 60 mass %, preferably 5 mass % or greater but not greater than 40 mass %. Contents of the water-soluble solvent in the ink less than 1 mass % may result in an insufficient optical density. Contents exceeding 60 mass %, on the other hand, may result in unstable jet properties of the ink liquid due to an increase in the viscosity of the liquid.

The preferred physical properties of the inkjet recording ink of the invention are as follows. The surface tension of the ink is preferably 20 mN/m or greater but not greater than 60 mN/m, more preferably 20 mN/m or greater but not greater than 45 mN/m, still more preferably 25 mN/m or greater but not greater than 35 mN/m. When the surface tension is less than 20 mN/m, the liquid may overflow onto the nozzle surface of the recording head, which prevents normal printing. When the surface tension exceeds 60 mN/m, on the other hand, the ink may slowly penetrate into the recording medium after printing, which retards the drying time.

The above surface tension is measured under the environment of 23° C. and 55% RH by using a Wilhelmy surface tension balance.

The viscosity of the ink is preferably 1.2 mPa·s or greater but not greater than 8.0 mPa·s, more preferably 1.5 mPa·s or greater but less than 6.0 mPa·s, still more preferably 1.8 mPa·s or greater but less than 4.5 mPa·s. Viscosities greater than 8.0 mPa·s may deteriorate ink ejection properties. Viscosities less than 1.2 mPa·s, on the other hand, may deteriorate the long-term ejection properties.

The above-described viscosity (including that to be described later) is measured by using a rotational viscometer "Rheomat 115" (trade name; product of Contraves Co.) at 23° C. and a shear rate of $1400 \text{ s}^{-1}$.

In addition to the above-described components, water is added to the ink within a range to give the preferred surface tension and viscosity described above. Although no particular limitation is imposed on the amount of water in the ink, it is preferably 10 mass % or greater but not greater than 99 mass %, more preferably 30 mass % or greater but not greater than 80 mass %.

Further, for the purpose of controlling the properties of the ink, for example, improvement of ejection properties, it is possible to use, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as acrylic polymer emulsion, polyurethane emulsion, and hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, for regulating electrical conductivity and pH of the ink, it is possible to use compounds of an alkali metal such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of an alkaline earth metal such as calcium hydroxide; acids such as sulfuric acid, hydrochloric acid, and nitric acid; and salts between a strong acid and a weak alkali such as ammonium sulfate.

It is also possible to add, if necessary, pH buffers, antioxidants, antifungal agents, viscosity regulators, conductive agents, ultraviolet absorbers, and the like.

[Coloring Composition for Color Filter]

The color-filter coloring composition of the invention contains the above-described pigment composition of the invention. It preferably contains a polymerizable compound and a solvent further.

When the color-filter coloring composition of the invention is prepared, the azo pigment obtained in the above-described manner may be incorporated as is or a pigment dispersion obtained by dispersing it in a solvent may be incorporated. Using the azo pigment in the form of a pigment dispersion is preferred because it improves color characteristics, durability, dispersion stability, light fastness, and weather resistance.

The using amount of an organic pigment in the color-filter coloring composition of the invention is preferably from 0.01 to 2 parts by mass, particularly preferably from 0.1 to 1 part by mass, based on 1 part by mass of the polymerizable compound.

[Polymerizable Compound]

The polymerizable compound may be selected as needed in consideration of the production process of a color filter. Examples of the polymerizable compound include photosensitive compounds and thermosetting compounds, with photosensitive compounds being particularly preferred.

The photosensitive compound is selected from at least one of photopolymerizable resins, photopolymerizable monomers, and photopolymerizable oligomers. That having an ethylenically unsaturated bond is preferred. The coloring composition for color filter is required to have a component which is converted into a resin when cured. It may have only a component which has not been converted into a resin when not cured.

Examples of the photopolymerizable compounds, photopolymerizable monomers, and photopolymerizable oligomers include (meth)acrylates such as 2-hydroxyethyl(meth)acrylate, 2-hydroxypropyl(meth)acrylate, 2-ethylhexyl(meth)acrylate, ethylene glycol di(meth)acrylate, diethylene glycol di(meth)acrylate, triethylene glycol di(meth)acrylate, polyethylene glycol di(meth)acrylate, pentaerythritol di(meth)acrylate, dipentaerythritol tetra(meth)acrylate, dipentaerythritol hexa(meth)acrylate, bisphenol A epoxy di(meth)acrylate, bisphenol F epoxy di(meth)acrylate, bisphenol fluorene-based epoxy di(meth)acrylate. Additional examples include vinyl resins such as acrylic acid (co)polymers, (meth)acrylic acid (co)polymers, and maleic acid (co)polymers and resins having, on the side chain thereof, an ethylenic double bond such as polyethylene oxide, polyvinylpyrrolidone, polyamide, polyurethane, polyether, and polyester. They may be used either singly or in combination. The amount of the polymerizable compound is from 20 to 95 mass %, preferably from 40 to 80 mass % in the total solid content of the composition for color filter.

The polymerizable compound is added in an amount of preferably from 40 to 95 mass %, more preferably from 50 to 90 mass %, in the total solid content of the composition for color filter. The composition may contain another resin or the like if necessary and in this case, it is desired that the total amount including this resin falls within the above range. The term "total solid content" as used herein means a content which has remained as a solid content after drying and curing and it contains not a solvent but a monomer.

[Photopolymerization Initiator]

When a photosensitive compound is used as the polymerizable compound, a photopolymerization initiator is used together with at least one of the monomers and oligomers exemplified as the photosensitive compound. As the photopolymerization initiator, at least one selected from compounds such as benzophenone derivatives, acetophenone derivatives, benzoin derivatives, benzoin ether derivatives, thioxanthone derivatives, anthraquinone derivatives, naphthoquinone derivatives, and triazine derivatives is used. A known photosensitizer may be used in combination with these photopolymerization initiators.

Examples of the thermosetting resin include melamine resin, urea resin, alkyd resin, epoxy resin, phenolic resin, and cyclopentadiene resin.

The "photosensitive resin" or "thermosetting resin" as used in this specification and claims contains not only the cured resin but also at least one of polymerizable monomers and oligomers.

In combination with at least one of the photosensitive resin and thermosetting resin, a binder resin having an acid group and a resin conventionally used for ink such as acrylic resin and urethane resin may be used as an another polymerizable compound.

[Solvent]

The pigment dispersion may be aqueous or nonaqueous and it differs depending on the production process of a color filter. For example, in the photolithographic method, a non-aqueous pigment dispersion is preferred. In the inkjet method, either one is possible.

Examples of the solvent to be used for the coloring composition of the invention include fatty acid esters such as ethyl acetate, butyl acetate, ethylene glycol monomethyl ether acetate, and propylene glycol monomethyl ether acetate; ketones such as acetone, methyl ethyl ketone, methyl isobutyl ketone, cyclohexanone, and diacetone alcohol; aromatic compounds such as benzene, toluene, and xylene; alcohols such as methanol, ethanol, n-propanol, isopropanol, and n-butanol; glycols such as ethylene glycol, diethylene glycol, triethylene glycol, tetraethylene glycol, polyethylene glycol, propylene glycol, dipropylene glycol, tripropylene glycol, polypropylene glycol, trimethylene glycol, and hexanetriol; glycerin; alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether, and propylene glycol monoethyl ether; alkylene glycol dialkyl ethers such as triethylene glycol dimethyl ether, triethylene glycol diethyl ether, tetraethylene glycol dimethyl ether, and tetraethylene glycol diethyl ether; ethers such as tetrahydrofuran, dioxane, and diethylene glycol diethyl ether; alkanolamines such as monoethanolamine, diethanolamine, and triethanolamine; nitrogen-containing polar organic solvents such as N,N-dimethylformamide, N,N-dimethylacetamide, N-methyl-2-pyrrolidone, 2-pyrrolidone, and 1,3-dimethyl-2-imidazolidinone; and water.

Among the above-described solvents, water-soluble organic solvents may be used as a water-based medium after being mixed with water. A mixture obtained by mixing two or more of the above solvents other than water may be used as an oil-based medium.

The color-filter coloring composition of the invention further contains preferably at least one dispersant selected from surfactants, silicone additives, silane coupling agents, and titanium coupling agents. These dispersants may also be used in combination of two or more.

Specific examples of the dispersant will next be described.

Although no particular limitation is imposed on the surfactant insofar as it has a surface activating effect. Examples include cationic, anionic, nonionic, and amphoteric surfactants. Specific examples include anionic surfactants such as alkane sulfonates, linear alkylbenzene sulfonates, branched alkylbenzene sulfonates, alkyl naphthalene sulfonates, naphthalene sulfonate formaldehyde condensates, alkyl sulfates, polyoxyethylene alkyl ether sulfates, alkyl phosphates, polyoxyethylene alkyl ether phosphates, and aliphatic monocarboxylates; cationic surfactants such as alkylamine salts and quaternary amine salts; nonionic surfactants such as glycerin fatty acid esters, sorbitan fatty acid esters, polyoxyethylene alkyl ethers, polyoxyethylene alkyl phenyl ethers, polyethylene glycol fatty acid esters, and polyoxyethylene sorbitan fatty acid esters; amphoteric surfactants such as alkyl betaines; and polymer surfactants which may be any of cationic, anionic, nonionic and amphoteric.

Specific examples of the silicone additives include polyalkylsiloxanes, polyalkylphenylsiloxanes, polyorganosiloxanes, polydimethylsiloxane, polyorganosiloxane polyether copolymers, polyfluorosiloxanes, and organosilanes. These silicone additives may be used in combination of two or more.

Examples of silane coupling agents may include vinyltrimethoxysilane, vinyltriethoxysilane, vinyltris(β-methoxyethoxy)silane, β-(3,4-epoxycyclohexyl) ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, hydroxypropyltrimethoxysilane, n-hexadecyltrimethoxysilane, and n-octadecyltrimethoxysilane.

Specific examples of the titanium coupling agents may include isopropyltri(N-aminoethylaminoethyl)titanate and dibutoxybistriethanolamine titanate.

The amount of the dispersant varies, depending on the kind of the dispersant employed. It is preferably from 0.1 to 100 parts by mass, particularly preferably from 0.5 to 80 parts by mass based on 100 parts by mass of the organic pigment.

No particular limitation is imposed on the using method of the dispersant and it may be used in accordance with the known preparation process of a coloring composition for the photolithographic method.

The invention also provides a color filter available by using the above-described coloring composition for color filter. This color filter exhibits a high contrast and a good light transmittance. More specifically, it exhibits a light transmittance of preferably 85% or greater, more preferably 90% or greater at a wavelength of 650 nm.

The color filter of the invention may be produced using any known method. Preferred examples include photolithographic method and inkjet method. The photolithographic method and inkjet method will hereinafter be described specifically.

1) Photolithographic Method

When a color filter is formed using the photolithographic method, a photosensitive resin is employed as a polymerizable compound of the color-filter coloring composition of the invention. The photosensitive resin is incorporated, together with a photopolymerization initiator, in the coloring composition as a monomer or an oligomer and after being cured by exposure to light, it forms a film on a transparent substrate.

As the photosensitive resin, a polymer or copolymer of the above-described polymerizable monomer having in the molecule thereof one or more ethylenic double bonds is suitably used.

As the photosensitive resin (polymerizable monomer), acrylates and methacrylates are particularly preferred. Specific examples include methyl acrylate, methyl methacrylate, butyl methacrylate, butyl acrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, dipentaerythritol pentaacrylate, dipentaerythritol pentamethacrylate, glycerol diacrylate, glycerol dimethacrylate, 1,4-butanediol diacrylate, 1,4-butanediol dimethacrylate, bisphenol A diacrylate, and bisphenol A dimethacrylate.

When the photolithographic method is employed, the color-filter coloring composition of the invention contains, in addition to the above-described photosensitive resin, a binder resin having an acidic group. Examples of the binder resin having an acidic group include resins having a carboxyl group, a hydroxy group, a sulfonic acid group, or the like. Binder resins having at least one of a carboxyl group and a hydroxyl group are preferred.

As the binder resin having an acidic group, preferred are copolymers obtained using a monomer having an ethylenic double bond selected from acrylates, methacrylates, styrene, vinyl acetate, vinyl chloride, N-vinylpyrrolidone, acrylamide, and the like and a monomer having an ethylenic double bond and an acidic group selected from acrylic acid, methacrylic acid, p-styrenecarboxylic acid, p-styrenesulfonic acid, p-hydroxystyrene, and maleic anhydride.

The binder resin having an acidic group is used in an amount of preferably from 0.5 to 4 parts by mass, particularly preferably from 1 to 3 parts by mass, relative to 1 part by mass of the photosensitive resin (polymerizable monomer).

As the solvent used in the coloring composition for the photolithographic method, at least one oil-based medium selected from fatty acid esters, ketones, aromatic compounds, alcohols, glycols, glycerin, alkylene glycol monoalkyl ethers, alkylene glycol dialkyl ethers, ethers, and nitrogen-containing polar organic solvents can be used.

The solvent is used in an amount of from 3 to 30 times the mass, particularly preferably from 4 to 15 parts by mass of the total mass of the components of the coloring composition other than the solvent.

If necessary, the coloring composition for the photolithographic method according to the invention may contain, in addition to the above-described components, known additives (described in Japanese Patent Laid-Open No. 2003-306623) such as wetting agents, anti-fading agents, emulsion stabilizers, ultraviolet absorbers, antiseptics, antifungal agents, pH regulators, surface tension regulators, anti-foaming agents, viscosity regulators, dispersion stabilizers, rust inhibitors, and chelating agents. These various additives may be added to an oil phase or an aqueous phase upon preparation.

The color-filter coloring composition of the invention can be prepared by a process including a step of uniformly mixing and dispersing the above-described pigment composition of the invention, the polymerizable compound, the solvent, and the other additives with equipment such as bead mill, ball mill, sand mill, twin-roll mill, triple-roll mill, homogenizer, kneader, or disperser, and a step of regulating the viscosity of the resulting dispersion with the above-described solvent or the like.

In order to form a color filter on a display substrate with the color-filter coloring composition of the invention, a known photolithographic method may be employed. A color filter can be obtained, for example, by using a method including a step of uniformly applying the coloring composition of the invention onto a display substrate by using a known method such as printing, spraying, bar coating, roll coating, or spin coating, a step of heating to remove the solvent from the ink, a step of exposing a color filter pattern on the display substrate to a high-pressure mercury lamp or the like, a step of developing the pattern with an alkali, a step of washing, and a step of baking.

2) Inkjet Method

When a color filter is formed using the inkjet method, no particular limitation is imposed on the polymerizable compound of the color-filter coloring composition of the invention and any compound is usable insofar as it is conventionally used in an ink for inkjet system. At least one monomer of the photosensitive resins and the thermosetting resins is preferably used.

Examples of the photosensitive resins include acrylic resins, methacrylic resins, and epoxy resins, with acrylic resins and methacrylic resins being preferred. Preferred examples of the acrylic resins and methacrylic resins include combinations of a photopolymerizable monomer selected from acrylates, methacrylates, urethane acrylate, urethane methacrylate, acrylic amide, methacrylic amide, alkyl acrylates, benzyl methacrylate, benzyl acrylate, aminoalkyl methacrylates, and the like and a photopolymerization initiator selected from benzophenone derivatives, acetophenone derivatives, benzoin derivatives, benzoin ether derivatives, thioxanthone derivatives, anthraquinone derivatives, naphthoquinone derivatives, and triazine derivatives, and the like. In addition to the above-described photopolymerizable monomers, a photopolymerizable monomer having a hydrophilic group such as acrylic acid, methacrylic acid, maleic acid, or vinyl acetate may be added to the composition.

Examples of the thermosetting resin include melamine resins, urea resins, alkyd resins, epoxy resins, phenolic resins, and cyclopentadiene resins.

When a color filter is formed using the inkjet method, the solvent used in the coloring composition of the invention may be either an oil-based medium or a water-based medium. The water-based medium is preferred. As the water-based medium, water or a mixed solvent of water and a water-soluble organic solvent is used, with the mixed solvent of water and a water-soluble organic solvent being preferred. A deionized solvent is also preferred.

Although no particular limitation is imposed on the oil-based medium to be used in the coloring composition, those exemplified above as the solvent for the coloring composition to be used in the photolithographic method can be used for example.

Examples of the solvent used in the water-based medium include those selected from alcohols, ketones, ethers, glycols, glycerin, alkylene glycol monoalkyl ethers, alkylene glycol dialkyl ethers, alkanolamines, and nitrogen-containing polar organic solvents and having water solubility. These water-soluble organic solvents may be used either singly or in combination.

Although no particular limitation is imposed on the using amount of the solvent, it may be adjusted as needed so that the viscosity of the coloring composition at room temperature becomes 20 mPa·s or less, preferably 10 mPa·s or less.

The coloring composition of the invention can be prepared in a similar manner to that of the coloring composition to be used in the photolithographic method including a step of dispersing and mixing the components. Upon dispersing, a dispersant may be added to the composition as in the photolithographic method.

The coloring composition of the invention may contain, in addition to the above-described components, various known additives such as wetting agent, anti-fading agent, emulsion stabilizer, ultraviolet absorber, antiseptic, antifungal agent, pH regulator, surface tension regulator, anti-foaming agent, viscosity regulator, and dispersion stabilizer, if necessary.

No particular limitation is imposed on the formation method of a color filter using the coloring composition thus obtained insofar as it is a formation method of a color filter using the known inkjet method. A color filter can be formed using a method including, for example, a step of forming predetermined color filter patterns in the form of liquid droplets on a display substrate, drying the resulting substrate, and subjecting the substrate to heat treatment or exposure to light or both of them to cure the color filter patterns on the substrate into a film.

The photolithographic method and the inkjet method are described above, but the color filter of the invention may be obtained using another method.

Even when a color filter formation method (for example, various printing methods including offset printing) other than the above-described method is used, the coloring composition for color filter and the color filter obtained using it are still within the scope of the invention insofar as the coloring composition contains the above-described polymerizable compound and solvent and the azo compound represented by the formula (1) is used as a colorant.

For example, the components such as polymerizable compound, solvent, and additive and the formulation upon formation of the color filter may be determined in accordance with conventional examples and they are not limited to those exemplified above with respect to the photolithographic method and inkjet method.

The color filter of the invention thus available forms image elements together with G (green) and B (blue) color filter patterns by a known method. Such a color filter can provide a liquid crystal display having very high transparency, excellent spectroscopic properties, and a less depolarizing effect, and capable of displaying a clear image.

Examples of the formation method of a color filter include a method of first forming patterns using a photoresist and then dyeing them and a method of forming patterns with a photoresist containing a colorant as disclosed in Japanese Patent Laid-Open No. 163552/1992, 128703/1992, or 175753/1992. The pigment composition of the invention may be incorporated in the color filter by using any of these methods, but preferred is the color filter formation method described in Japanese Patent Laid-Open No. 175753/1992 or 35182/1994, including applying a positive resist composition containing a thermosetting resin, a quinonediazide compound, a crosslinking agent, the pigment composition of the invention, and a solvent onto a substrate, exposing it through a mask, developing the exposed portion to form a positive resist pattern, exposing the entire surface of the positive resist pattern, and then curing the exposed positive resist pattern. It is also possible to obtain an RGB primary color-type or YMC complementary color-type color filter after forming a black matrix in a conventional manner. Although there is no limitation on the using amount of the organic pigment in the color filter as in the pigment composition of the invention, an amount of from 0.1 to 50 mass % is preferred.

As the thermosetting resin, the quinonediazide compound, the crosslinking agent, the solvent and their amounts used for the formation of a color filter, those described in the above-described patent documents may be preferably used.

EXAMPLES

The invention will hereinafter be described in detail based on Examples. It should however be borne in mind that the invention is not limited to or by these Examples. Additionally, "part" or "parts" as used in Examples are part or parts by mass, respectively.

X-ray diffraction of the α crystal form azo pigment is measured according to Japanese Industrial Standards JIS K0131 (General rules for X-ray diffractometric analysis) under the following conditions by using a powder X-ray diffractometer "RINT2500" (trade name; product of Rigaku Corporation) and CuKα radiation.
Measuring apparatus used: automatic X-ray diffractometer, "RINT2500" (trade name; product of Rigaku Corporation)
X-ray tube: Cu
Tube voltage: 55 KV
Tube current: 280 mA
Scanning method: 2θ/θ scan
Scanning rate: 6 deg./min
Sampling interval: 0.100 deg.
Starting angle (2θ): 5 deg.
Stopping angle (2θ): 55 deg.
Divergence slit: 2 deg.
Scattering slit: 2 deg.
Receiving slit: 0.6 mm
An upright goniometer is used.

Synthesis Example 1

The α crystal form azo pigment represented by the formula (1) was synthesized through the following route.

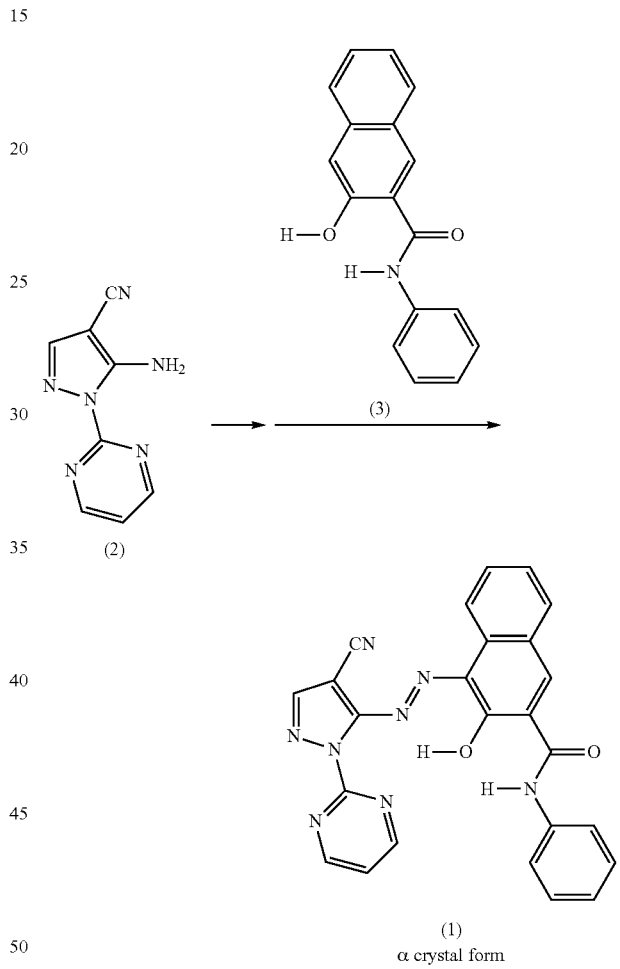

Synthesis of α Crystal Form Azo Pigment

The compound (20 g) represented by the formula (2) was added to 200 ml of phosphoric acid to completely dissolve the former in the latter at room temperature. The resulting solution was ice cooled and kept at −5° C. Sodium nitrite (8.0 g) was added and the mixture was stirred for 40 minutes. Then, 3.3 g of sodium nitrite was added and the mixture was stirred fur 20 minutes. To the reaction mixture was added 1.5 g of urea to obtain a diazonium salt solution. The resulting diazonium salt solution was added dropwise to a solution obtained by dissolving 21 g of the compound represented by the formula (3) in N,N-dimethylacetamide (DMAc) (400 ml) over 80 minutes while keeping the temperature at from 5 to 10° C. The solution thus obtained was stirred for 2 hours while keeping the temperature at from 5 to 10° C. Then, 240 ml of methanol was added, followed by stirring for 10 minutes.

Crystals thus precipitated were collected by filtration and washed while pouring 300 ml of methanol thereon. Without drying, the crystals were neutralized with 500 ml of water and 50 ml of saturated sodium bicarbonate. The crystals thus precipitated were collected by filtration and washed while pouring thereon 300 ml of water. Then, they were dried at 50° C. for 24 hours with a blow dryer. The crystals thus obtained (water content: 0.50%) were suspended in 400 mL of DMAc. After stirring at 80° C. for 30 minutes, the reaction mixture was cooled to room temperature over 2 hours. The crystals thus obtained were collected by filtration and dried for 24 hours at room temperature and then for 10 hours in a vacuum desiccator of 50° C. to obtain 26.9 g of an α crystal form azo pigment. Yield: 82%.

As a result of X-ray diffraction measurement of the resulting α crystal form azo pigment under the above conditions, it showed a characteristic X-ray diffraction peak at Bragg angles (2θ±0.2°) of 6.9°, 21.5°, and 27.3°. In addition, it had a peak height of 0.6 or less at 11.9° relative to a peak height at 10.9°. The CuKα characteristic X-ray diffraction pattern is shown in FIG. 1.

Example 1

Preparation of Pigment Dispersion 1

The α crystal form azo pigment (2.5 parts) prepared in Synthesis Example 1, 0.5 part of sodium oleate, 5 parts of glycerin, and 42 parts of water were mixed and the resulting mixture was dispersed for 6 hours at a speed of 300 rotations per minute by using a planetary ball mill with 100 parts of zirconia beads having a diameter of 0.1 mm. After completion of the dispersing operation, the zirconia beads were separated to obtain a red pigment dispersion 1 (volume-average particle size: Mv: ca. 82 nm; measured using Nanotrac 150 ("UPA-EX150", trade name; product of Nikkiso Co., Ltd).

Synthesis Example 2

The β crystal form azo pigment represented by the formula (1) was synthesized through the following route.

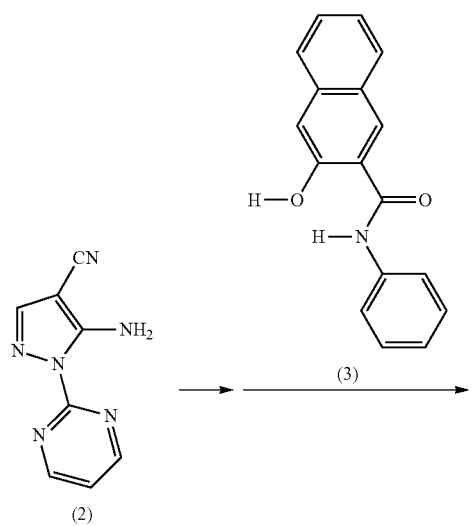

(2)

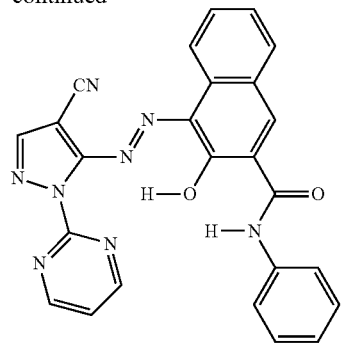

(1)

β crystal form

Synthesis of β Crystal Form Azo Pigment

The compound (20 g) represented by the formula (2) was added to 200 ml of phosphoric acid to completely dissolve the former in the latter at room temperature. The resulting solution was ice cooled and kept at −5° C. Sodium nitrite (8.0 g) was added and the mixture was stirred for 40 minutes. Then, 3.3 g of sodium nitrite was added again and the mixture was stirred for 20 minutes. To the reaction mixture was added 1.5 g of urea to obtain a diazonium salt solution. The resulting diazonium salt solution was added dropwise to a solution, which had been obtained by dissolving 21 g of the compound represented by the formula (3) in N,N-dimethylacetamide (DMAc) (400 ml), over 80 minutes while keeping the temperature at from 5 to 10° C. The solution thus obtained was stirred for 2 hours while keeping the temperature at from 5 to 10° C. Then, 240 ml of methanol was added, followed by stirring for 10 minutes. The crystals thus precipitated were collected by filtration and washed while pouring 300 ml of methanol thereon. Without drying, the crystals were neutralized with 500 ml of water and 50 ml of saturated sodium bicarbonate. The crystals thus precipitated were collected by filtration and washed while pouring thereon 300 ml of water. Then, the composition (having a water content of 61 mass %) containing the resulting crystals and water was suspended in 400 mL of DMAc without drying. After stirring at 80° C. for 60 minutes, the reaction mixture was cooled to room temperature over 2 hours. The crystals thus obtained were collected by filtration and dried for 24 hours at room temperature and then for 10 hours in a vacuum desiccator of 50° C. to obtain 26.2 g of an β crystal form azo pigment. Yield: 80%.

Figure 2:
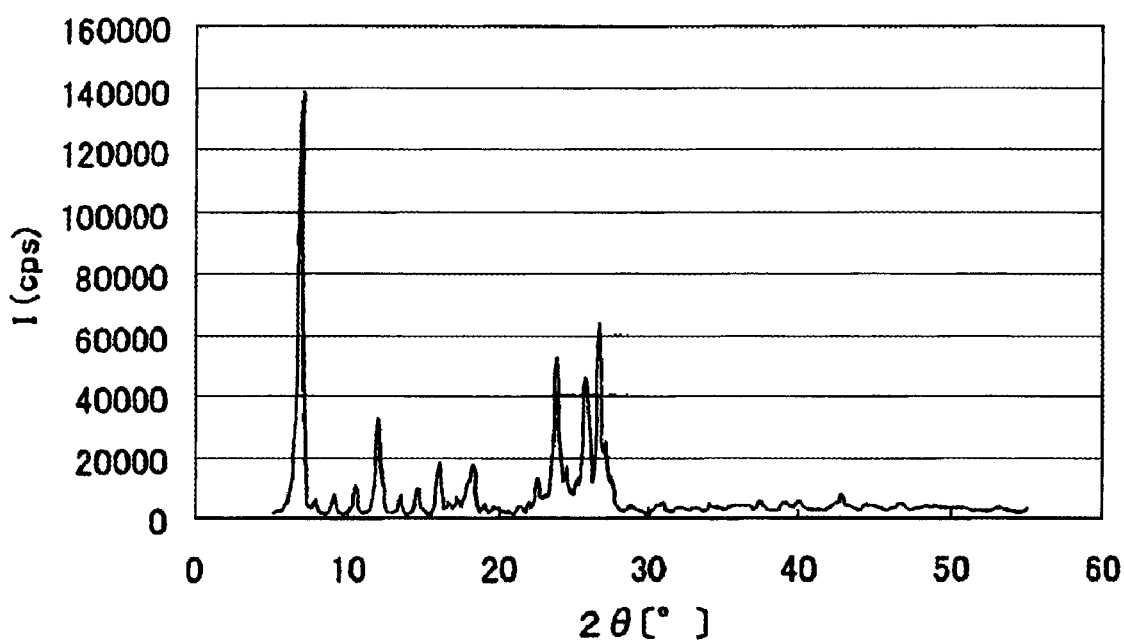
FIG. 2 is an X-ray diffraction pattern of an β crystal form pigment (1) synthesized according to Synthesis Example 11.
Figure 3:
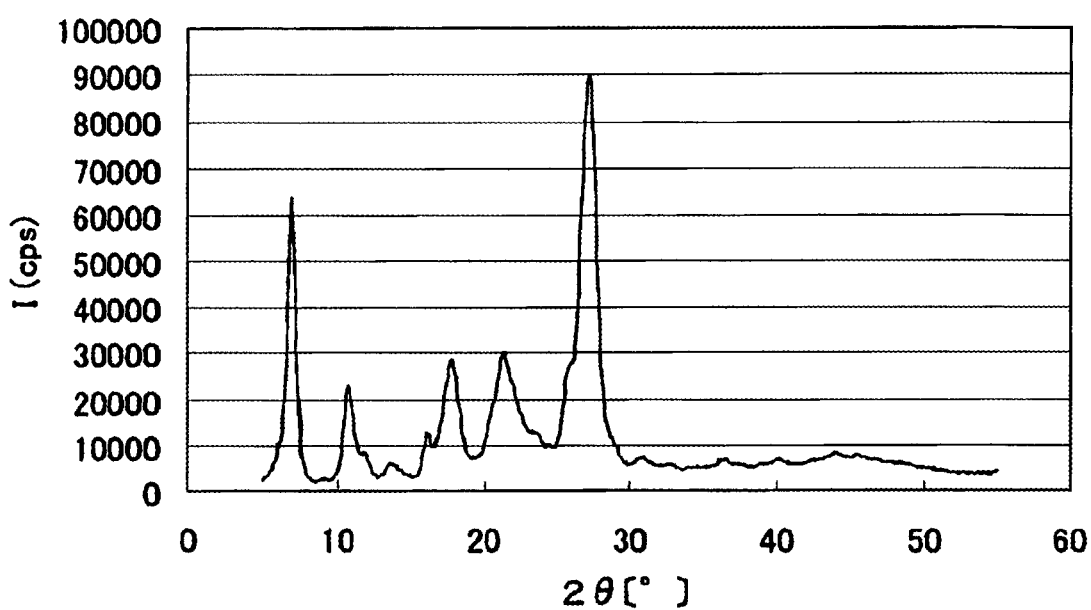
FIG. 3 is an X-ray diffraction pattern of a pigment (D-1) synthesized according to Synthesis Example 2.

As a result of X-ray diffraction measurement of the resulting β crystal form azo pigment under the above conditions, it has a characteristic X-ray diffraction peak at Bragg angles (2θ±0.2°) of 7.1°, 11.7°, 20.0°, and 27.1°. In addition, it had a peak height at 10.9° of 0.2 or less relative to a peak height at 11.9°. The CuKα characteristic X-ray diffraction pattern is shown in FIG. 2.

Example 11

Preparation of Pigment Dispersion 11

The β crystal form azo pigment (2.5 parts) prepared in Synthesis Example 11, 0.5 part of sodium oleate, 5 parts of glycerin, and 42 parts of water were mixed. The resulting mixture was dispersed for 6 hours at a speed of 300 rotations per minute by using a planetary ball mill together with 100 parts of zirconia beads having a diameter of 0.1 mm. After completion of the dispersing operation, the zirconia beads were separated and a yellow pigment dispersion 1 (volume-average particle size; Mv: ca. 82 nm; measured using Nanotrac 150 ("UPA-EX150", trade name) manufactured by Nikkiso Co., Ltd.) was obtained.

Comparative Synthesis Example 1

An azo pigment (D-1) represented by the formula (1) was synthesized through the following route.

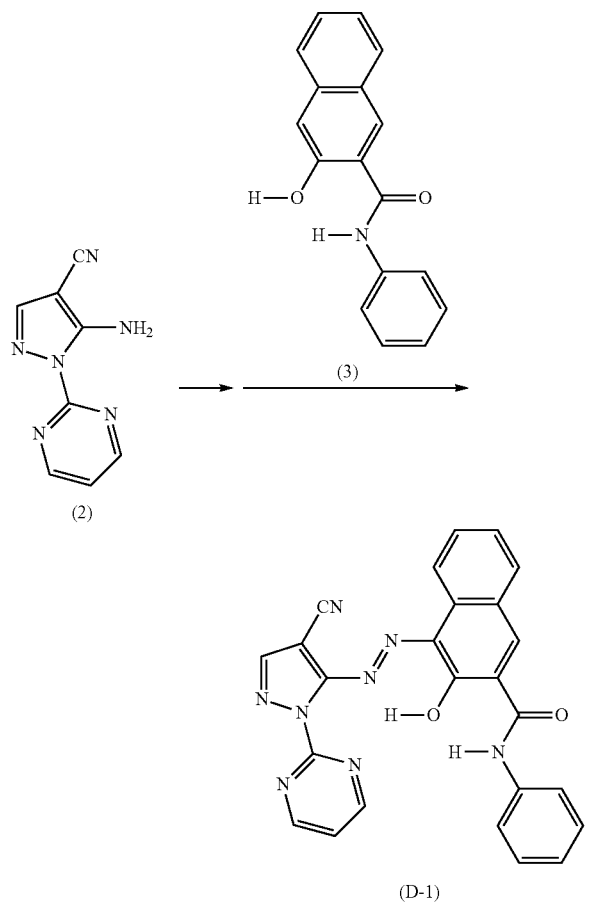

The compound (2) (1.0 g) was dissolved in 10 ml of phosphoric acid (reagent of a special grade, purity: 85%; product of Wako Pure Chemical Industries, which will equally apply hereinafter). The resulting solution was ice cooled and kept at from −5 to 0° C. Sodium nitrite (0.38 g) was added and the mixture was stirred for one hour to obtain a diazonium salt solution. Separately, 25 ml of acetonitrile was added to 1.30 g of Compound (3) and under stirring, the diazonium salt solution obtained above was added at 8° C. or less. As soon as the addition was completed, ice bath was removed and stirring was performed for further 3 hours. To the reaction mixture was added 50 ml of acetonitrile and the resulting mixture was stirred for 30 minutes. Crystals thus precipitated were collected by filtration and then washed while pouring thereon 30 ml of acetonitrile. Without drying, the crystals were added to 100 ml of water. A solution obtained by dissolving 0.5 g of sodium bicarbonate in 30 ml of water was added and the mixture was stirred at from 20 to 25° C. for 30 minutes. The crystals thus precipitated were collected by filtration and washed sufficiently while pouring water thereon. Without drying, the crystals thus obtained were added to 50 ml of dimethylacetamide and the mixture was stirred for 30 minutes under heating at 100° C. After stirring at room temperature for 30 minutes, crystals thus precipitated were collected by filtration and washed while pouring thereon 30 ml of dimethylacetamide. Without drying, the crystals thus obtained were added to 50 ml of dimethylacetamide. Then, water (25 ml) was added dropwise and the reaction mixture was stirred at 80° C. for 1 hour and stirred further at room temperature for 30 minutes. The crystals thus precipitated were filtered and washed while pouring thereon 20 ml of a 2:1 mixture of dimethylacetamide and water and 20 ml of methanol. The resulting crystals were dried to obtain 1.2 g of (D-1) represented by the formula (1). Yield: 52%.

The resulting azo pigment (D-1) was analyzed using CuKα characteristic X-ray diffraction. It was found, by dividing the peak intensity at 10.9° which is characteristic to the α crystal form azo pigment by the sum of the peak intensity at 10.9° which is characteristic to the α crystal form azo pigment and the peak intensity at 11.9° which is characteristic to the β crystal form azo pigment, that the azo pigment (D-1) is a mixture composed of 74% of the α crystal form azo pigment represented by the formula (1) and 26% of the β crystal form azo pigment represented by the formula (1) (a mixture of α crystal and β crystal). The CuKα characteristic X-ray diffraction pattern of the azo pigment (D-1) is shown in FIG. 2.

Comparative Example 1

Preparation of Comparative Pigment Dispersion 1

In a similar manner to Example 1 except that the azo pigment (D-1) was used instead of the α crystal form azo pigment used in Example 1, a red comparative pigment dispersion 1 was obtained.

Comparative Example 2

Preparation of Comparative Pigment Dispersion 2

In a similar manner to Example 1 except that C.I. Pigment Red 254 ("B-CF", trade name; product of Ciba Specialty Chemicals) was used instead of the α crystal form azo pigment used in Example 1, a red comparative pigment dispersion 2 was obtained.

(Evaluation)
<Evaluation of Tinctorial Strength>

The pigment dispersions obtained above were each applied to photo matte paper (exclusive use for pigment) produced by Seiko Epson Corporation by using a No. 3 bar coater. The image density of each of the applied products was measured using a reflection densitometer ("X-Rite 938", trade name; product of X-Rite) and the "tinctorial strength (OD: Optical Density)" was evaluated on the following criteria. The results are shown in Table 1.

A: OD is 1.6 or greater.
B: OD is 1.4 or greater but less than 1.6.
C: OD is 1.2 or greater but less than 1.4.
D: OD is less than 1.2.

<Evaluation of Solvent Resistance>

Solvent resistance was evaluated in the following manner: 10 mg of each of the α crystal four azo pigment represented by the formula (1) and used in the pigment dispersion 1 (Example 1), the β crystal form azo pigment represented by the formula (1) and used in the pigment dispersion 11 (Example 11), the azo pigment (D-1) used in the comparative pigment dispersion 1 (Comparative Example 1), and C.I. Pigment Red 254 used in the comparative pigment dispersion 2 (Comparative Example 2) was suspended in 50 mL of N-methylpyrrolidone and heated at the internal temperature of 60° C. for 10 minutes. The pigment which was dissolved completely upon heating was rated B and the pigment which was not dissolved completely upon heating was rated A.

<Evaluation of Hue>

The hue was evaluated according to the visual observation, based on the following three criteria, of the reflection spectrum of the applied product having an OD value of 1.0 as measured using the method in the above-described tinctorial strength evaluation.

(1) Hue without a yellowish tint.
(2) Hue without a bluish tint.
(3) Clear hue.
A: All of them are satisfied.
B: Two of them are satisfied.
C: One of them is satisfied.
D: None of them are satisfied.

<Evaluation of Light Fastness>

As to the pigment dispersion 1 (Example 1), the azo pigment (D-1) used in the comparative pigment dispersion 1 (Comparative Example 1), and C.I. Pigment Red 254 used in the comparative pigment dispersion 2 (Comparative Example 2), the applied product having an image density of 1.0 used for the evaluation of tinctorial strength was exposed to a xenon light (170000 lux, in the presence of a cut-off filter of 325 nm or less) for 14 days by using a fadeometer and the image densities before and after the exposure to xenon were measured using a reflection densitometer. Light fastness was evaluated as a colorant residual ratio [(density after exposure/density before exposure)×100%]. The results are shown in Table 1.

TABLE 1

Evaluation results of water dispersion

|  | Pigment | Tinctorial strength | Solvent resistance | Hue | Light fastness |
|---|---|---|---|---|---|
| Example 1 | Pigment dispersion 1 (α crystal form azo pigment) | B | A | A | 87.7 |
| Comp. Ex. 1 | Comparative pigment dispersion 1 (azo pigment (D-1)) | B | A | C | 88.8 |
| Comp. Ex. 2 | Comparative pigment dispersion 2 (C.I. Pigment Red 254) | C | A | B | 62.3 |

As is apparent from the results of Table 1, the α crystal form pigment of the invention shows high solvent resistance and when provided as a pigment dispersion, it is particularly excellent in tinctorial strength and hue.

The pigment dispersion using the pigment of the invention is therefore suited for use, for example, in ink for inkjet printing.

<Evaluation of Light Fastness>

As to the pigment dispersion 11 (Example 11), the azo pigment (D-1) used in the comparative pigment dispersion 1 (Comparative Example 1), and C.I. Pigment Red 254 used in the comparative pigment dispersion 2 (Comparative Example 2), the applied product having an image density of 1.0 used for the evaluation of tinctorial strength was exposed to a xenon light (170000 lux, in the presence of a cut-off filter of 325 nm or less,) for 30 days by using a fadeometer and the image density before and after the exposure to xenon was measured using a reflection densitometer. Light fastness was evaluated as a colorant residual ratio [(density after exposure/density before exposure)×100%]. The results are shown in Table 2.

TABLE 2

Evaluation results of water dispersion

|  | Pigment | Tinctorial strength | Solvent resistance | Hue | Light fastness |
|---|---|---|---|---|---|
| Example 1 | Pigment dispersion 1 (β crystal form azo pigment) | B | A | B | 91.1 |
| Comp. Ex. 1 | Pigment dispersion 3 (azo pigment (D-1)) | B | A | C | 80.1 |
| Comp. Ex. 2 | Comparative pigment dispersion 1 (C.I. Pigment Red 254) | C | A | B | 42.1 |

As is apparent from the results of Table 2, the β crystal form pigment of the invention shows high solvent resistance and when provided as a pigment dispersion, it is particularly excellent in tinctorial strength and hue.

The pigment dispersion using the pigment of the invention is therefore suited for use, for example, in ink for inkjet printing.

Example 2

The high-molecular dispersant represented by Dispersant 10 described in WO2006/064193, p. 22 was neutralized with an aqueous solution of potassium hydroxide. To 75 parts by mass (solid content concentration: 20 mass %) of the aqueous dispersant solution thus obtained were added 30 parts by mass of the α crystal form azo pigment synthesized in Synthesis Example 1 and 95 parts by mass of deionized water. The resulting mixture was mixed and roughly dispersed by using a dispersing and agitating element. To the mixed and roughly dispersed liquid were added 600 parts by mass of zirconia beads. After dispersing them for 4 hours in a dispersing machine (sand grinder mill), the dispersion was separated from the beads. While stirring the resulting mixture, 2 parts by mass of polyethylene glycol diglycidyl ether ("Denacol EX-821", trade name; product of Nagase Chemtex) was gradually added at 25° C. The resulting mixture was stirred at 50° C. for 6 hours. Further, impurities were removed from the mixture through a ultra-filtration membrane with molecular weight cutoffs of 300K, followed by filtration through a 20-ml syringe equipped with a filter having a pore size of 5 μm (acetyl cellulose film; outer diameter: 25 mm; manufactured by Fujifilm) to remove coarse particles. Thus, a pigment dispersion 2 having a solid content concentration of 10 mass % (particle size: 80 nm; measured by using Nanotrac 150 (UPA-EX150; trade name) manufactured by Nikkiso Co., Ltd.) was obtained.

Comparative Example 3

In a similar manner to Example 2 except that the azo pigment (D-1) was used instead of the α crystal form azo pigment used in Example 2, a comparative pigment dispersion 3 was obtained.

Example 3

The pigment dispersion 2 obtained in Example 2 was added to give a concentration of 5 mass % in terms of a solid content; glycerin, 10 mass %; 2-pyrrolidone, 5 mass %; 1,2-hexanediol, 2 mass %; triethylene glycol monobutyl ether, 2 mass %; propylene glycol, 0.5 mass %; and deionized water, 75.5 mass %. The resulting mixture was filtered through a 20-ml syringe equipped with a filter (acetyl cellulose membrane, outer diameter: 25 mm, product of Fujifilm) having a pore size of 1 μm to remove coarse particles. As a result, a pigment ink liquid 3 of the invention was obtained.

Comparative Example 4

In a similar manner to Example 3 except that the comparative pigment dispersion 3 obtained in Comparative Example 3 was used instead of the pigment dispersion 2 obtained in Example 2, a comparative pigment ink liquid 4 was obtained.

"Ejection stability", "light fastness", "heat fastness", "ozone fastness", "metallic gloss", and "ink liquid stability" in Table 3 were evaluated as follows. Each ink was filled in the cartridge of the magenta red ink liquid for an inkjet printer "PX-V630" (trade name; product of Seiko Epson Corporation). As the other color inks, pigment ink liquids for PX-V630 were used. A mono-color image pattern and blue, red, and gray image patterns wherein density was stepwise changed were printed on photo paper <Glossy> manufactured by Seiko Epson Corporation and photo paper CRISPIA <High Glossy> manufactured by Seiko Epson Corporation, each used as an image receiver sheet, while selecting a recommended "high quality" mode to thereby evaluate image quality, ejection properties of the ink, and fastness of the image. Evaluations on them except the metallic gloss were conducted using printed mono-color image patterns.

The pigment ink liquid 3 of Example 3 and the comparative pigment ink liquid 4 of Comparative Example 4 were evaluated. The results are shown in Table 3.
(Evaluation Tests)

1) The ejection stability was evaluated according to the below-described criteria by inserting the cartridge in the printer, confirming ejection of the ink through all nozzles, and then outputting an image on 20 sheets of A4 size paper.
A: No disorder in printing from the start to the end.
B: Disorder in printing occurs due to the ejection.
C: Disorder in printing from the start to the end.

2) The image storage stability was evaluated in the following manner by using a printed image sample.

[1] Light fastness was evaluated by measuring the image density (Ci) of the sample just after printing by using Photographic Densitometer 310 ("X-rite 310", trade name; product of X-Rite), exposing the sample to xenon light (100,000 lux) using a weatherometer manufactured by Atlas Co., Ltd. for 14 days, and measuring the image density (Cf) of the sample to determine an image remaining ratio (Cf/Ci×100).

The image remaining ratio was determined at 3 points having reflection densities of 1, 1.5, and 2 respectively. When the image remaining ratio was 80% or greater at all three points, light fastness was ranked A, when the image remaining ratio was less than 80% at one or two points, light fastness was ranked B, and when the image remaining ratio was less than 80% at all three points, light fastness was ranked C.

[2] Heat fastness was evaluated by measuring the densities of the printed sample by using a reflection densitometer "X-rite 310" before and after storage of the sample under conditions of 80° C. and 60% RH for 7 days and determining an image remaining ratio. The image remaining ratio was determined at 3 points having reflection densities of 1, 1.5 and 2, respectively. When the image remaining ratio was 95% or greater at all three points, heat fastness was ranked A, when the image remaining ratio was less than 95% at one or two points, heat fastness was ranked B, and when the image remaining ratio was less than 95% at all three points, heat fastness was ranked C.

[3] Ozone resistance (ozone fastness) was evaluated by leaving the printed sample for 14 days in a box in which the ozone gas concentration was adjusted to 5 ppm (25° C., 50%), measuring the image densities before and after leaving the sample in the ozone gas atmosphere by using a reflection densitometer "X-Rite 310", and determining the image remaining ratio. The image remaining ratio was determined at 3 points having reflection densities of 1, 1.5, and 2, respectively. The ozone gas concentration in the box was set using an ozone gas monitor (model: OZG-EM-01) manufactured by APPLICS. When the image remaining ratio was 80% or greater at all three points, ozone resistance was ranked A, when the image remaining ratio was less than 80% at one or two points, ozone resistance was ranked B, and when the image remaining ratio was less than 70% at all three points, ozone resistance was ranked C.

[4] Appearance of metallic gloss:
Solid printed portions with magenta, blue, red yellow, green, and red were visually observed and evaluated under reflected light.

A sample from which no metallic gloss was observed was ranked A and a sample from which metallic gloss was observed was ranked B.

[5] Ink liquid stability:
Ink liquid stability of the pigment ink liquids obtained in Examples and Comparative Examples was evaluated by allowing them to stand at 60° C. for 10 days. The pigment ink liquid undergoing no change in the particle size was ranked A and the pigment ink liquid undergoing a change in the particle size was ranked B. The results are shown in the following Table 3.

TABLE 3

| Ink liquid | Image receiver sheet | Ejection stability | Light fastness | Heat fastness | Ozone fastness | Metallic gloss | Ink liquid stability | Pigment |
|---|---|---|---|---|---|---|---|---|
| Ex. 3 | Gloss | A | A | A | A | A | A | Pigment dispersion 1 (α crystal form azo pigment) |
| Ex. 3 | High gloss | A | A | A | A | A | A | Pigment dispersion 1 (α crystal form azo pigment) |
| Comp. Ex. 4 | Gloss | B | C | A | C | A | B | Azo pigment (D-1) |
| Comp. Ex. 4 | High gloss | B | C | A | C | A | B | Azo pigment (D-1) |

From the results of Table 2, it has been found that the pigment ink liquid using the pigment of the invention is excellent in ejection property and fastness, has reduced metallic gloss, and is excellent in stability of the pigment ink liquid.

As is apparent from the results of Table 2, the systems using the ink liquid of the invention are excellent in all the performances. Particularly, compared with the systems of the comparative example, the systems using the ink liquid of the invention are excellent in light fastness, ozone fastness, and ink liquid stability.

Example 4

An image was printed on inkjet photo-quality glossy paper "Kassai" (trade name; product of Fujifilm Corporation) with the pigment ink liquid 3 prepared in Example 3 by using "PX-V630" (trade name; product of Epson) and it was evaluated in a similar manner to Example 3. Similar results are obtained.

As is apparent from the results of Table 1 and Table 3, the pigment dispersions 1 and 2 and the pigment ink liquid 3 using the pigment of the invention are excellent in color tone and exhibit high tinctorial strength and light fastness.

The pigment dispersion using the pigment of the invention can therefore be used suitably, for example, for ink for printing such as inkjet printing.

Example 12

The high-molecular dispersant represented by Dispersant 10 described in WO2006/064193, p. 22 was neutralized with an aqueous solution of potassium hydroxide. To 75 parts by mass (solid content concentration: 20 mass %) of the aqueous dispersant solution thus obtained were added 30 parts by mass of the β crystal form azo pigment synthesized in Synthesis Example 1 and 95 parts by mass of deionized water. The resulting mixture was mixed and roughly dispersed by using a dispersing and agitating element. To the mixed and roughly dispersed liquid were added 600 parts by mass of zirconia beads. After dispersing them for 4 hours in a dispersing machine (sand grinder mill), the dispersion was separated from the beads. While stirring the resulting mixture, 2 parts by mass of polyethylene glycol diglycidyl ether ("Denacol EX-821", trade name; product of Nagase Chemtex) was gradually added at 25° C. The resulting mixture was stirred at 50° C. for 6 hours. Further, impurities were removed from the mixture through a ultra-filtration membrane with molecular weight cutoffs of 300K, followed by filtration through a 20-ml syringe equipped with a filter having a pore size of 5 μm (acetyl cellulose film; outer diameter: 25 mm; manufactured by Fujifilm) to remove coarse particles. Thus, a pigment dispersion 12 having a solid content concentration of 10 mass % (particle size: 80 nm; measured by using Nanotrac 150 (UPA-EX150; trade name) manufactured by Nikkiso Co., Ltd.) was obtained.

Comparative Example 13

In a similar manner to Example 12 except that the azo pigment (D-1) was used instead of the β crystal form azo pigment used in Example 12, a comparative pigment dispersion 13 was obtained.

Example 13

The pigment dispersion 12 obtained in Example 12 was added to give a concentration of 5 mass % in terms of a solid content; glycerin, 10 mass %; 2-pyrrolidone, 5 mass %; 1,2-hexanediol, 2 mass %; triethylene glycol monobutyl ether, 2 mass %; propylene glycol, 0.5 mass %; and deionized water, 75.5 mass %. The resulting mixture was filtered through a 20-ml syringe equipped with a filter (acetyl cellulose membrane, outer diameter: 25 mm, product of Fujifilm) having a pore size of 1 μm to remove coarse particles. As a result, a pigment ink liquid 13 of the invention was obtained.

Comparative Example 14

In a similar manner to Example 13 except that the comparative pigment dispersion 3 obtained in Comparative Example 13 was used instead of the pigment dispersion 12 obtained in Example 12, a comparative pigment ink liquid 14 was obtained.

"Ejection stability", "light fastness", "heat fastness", "ozone fastness", "metallic gloss", and "ink liquid stability" in Table 4 were evaluated as follows. Each ink was filled in the cartridge of the magenta red ink liquid for an inkjet printer "PX-V630" (trade name; product of Seiko Epson Corporation). As the other color inks, pigment ink liquids for PX-V630 were used. A mono-color image pattern and blue, red, and gray image patterns wherein density was stepwise changed were printed on photo paper <Glossy> manufactured by Seiko Epson Corporation and photo paper CRISPIA <High Glossy> manufactured by Seiko Epson Corporation, each used as an image receiver sheet, while selecting a recommended "high quality" mode to thereby evaluate image quality, ejection properties of the ink, and fastness of the image. Evaluations on them except the metallic gloss were conducted using printed mono-color image patterns.

The pigment ink liquid 13 of Example 13 and the comparative pigment ink liquid 14 of Comparative Example 14 were evaluated. The results are shown in Table 4.
(Evaluation Tests)

1) The ejection stability was evaluated according to the below-described criteria by inserting the cartridge in the printer, confirming ejection of the ink through all nozzles, and then outputting an image on 20 sheets of A4 size paper.
A: No disorder in printing from the start to the end.
B: Disorder in printing occurs due to the ejection.
C: Disorder in printing from the start to the end.

2) The image storage stability was evaluated in the following manner by using a printed image sample.

[1] Light fastness was evaluated by measuring the image density (Ci) of the sample just after printing by using Photographic Densitometer 310 ("X-rite 310", trade name; product of X-Rite), exposing the sample to xenon light (100,000 lux) using a weatherometer manufactured by Atlas Co., Ltd. for 14 days, and measuring the image density (Cf) of the sample to determine an image remaining ratio (Cf/Ci×100).

The image remaining ratio was determined at 3 points having reflection densities of 1, 1.5, and 2 respectively. When the image remaining ratio was 80% or greater at all three points, light fastness was ranked A, when the image remaining ratio was less than 80% at one or two points, light fastness was ranked B, and when the image remaining ratio was less than 80% at all three points, light fastness was ranked C.

[2] Heat fastness was evaluated by measuring the densities of the printed sample by using a reflection densitometer "X-rite 310" before and after storage of the sample under conditions of 80° C. and 60% RH for 7 days and determining an image remaining ratio. The image remaining ratio was determined at 3 points having reflection densities of 1, 1.5 and 2, respectively. When the image remaining ratio was 95% or greater at all three points, heat fastness was ranked A, when the image remaining ratio was less than 95% at one or two points, heat fastness was ranked B, and when the image remaining ratio was less than 95% at all three points, heat fastness was ranked C.

[3] Ozone resistance (ozone fastness) was evaluated by leaving the printed sample for 14 days in a box in which the ozone gas concentration was adjusted to 5 ppm (25° C., 50%), measuring the image densities before and after leaving the sample in the ozone gas atmosphere by using a reflection densitometer "X-Rite 310", and determining the image remaining ratio. The image remaining ratio was determined at 3 points having reflection densities of 1, 1.5, and 2, respectively. The ozone gas concentration in the box was set using an ozone gas monitor (model: OZG-EM-01) manufactured by APPLICS. When the image remaining ratio was 80% or greater at all three points, ozone resistance was ranked A, when the image remaining ratio was less than 80% at one or two points, ozone resistance was ranked B, and when the image remaining ratio was less than 70% at all three points, ozone resistance was ranked C.

[4] Appearance of metallic gloss:

Solid printed portions with magenta, blue, and red were visually observed and evaluated under reflected light.

A sample from which no metallic gloss was observed was ranked A and a sample from which metallic gloss was observed was ranked B.

[5] Ink liquid stability:

Ink liquid stability of the pigment ink liquids obtained in Examples and Comparative Examples was evaluated by allowing them to stand at 60° C. for 10 days. The pigment ink liquid undergoing no change in the particle size was ranked A and the pigment ink liquid undergoing a change in the particle size was ranked B. The results are shown in the following Table 4.

TABLE 4

| Ink liquid | Image receiver sheet | Ejection stability | Light fastness | Heat fastness | Ozone fastness | Metallic gloss | Ink liquid stability | Pigment |
|---|---|---|---|---|---|---|---|---|
| Ex. 13 | Gloss | A | A | A | A | A | A | Pigment dispersion 11 (β crystal form azo pigment) |
| Ex. 13 | High gloss | A | A | A | A | A | A | Pigment dispersion 11 (β crystal form azo pigment) |
| Comp. Ex. 14 | Gloss | B | C | A | C | A | B | Azo pigment (D-1) |
| Comp. Ex. 14 | High gloss | B | C | A | C | A | B | Azo pigment (D-1) |

From the results of Table 2, it has been found that the pigment ink liquid using the pigment of the invention is excellent in ejection property and fastness, has reduced metallic gloss, and is excellent in stability of the pigment ink liquid.

As is apparent from the results of Table 2, the systems using the ink liquid of the invention are excellent in all the performances. Particularly, compared with the systems of the comparative example, the systems using the ink liquid of the invention are excellent in light fastness, ozone fastness, and ink liquid stability.

Example 14

An image was printed on inkjet photo-quality glossy paper "Kassai" (trade name; product of Fujifilm Corporation) with the pigment ink liquid 13 prepared in Example 13 by using "PX-V630" (trade name; product of Epson) and it was evaluated in a similar manner to Example 13. Similar results are obtained.

As is apparent from the results of Table 2 and Table 4, the pigment dispersions 11 and 12 and the pigment ink liquid 13 using the pigment of the invention are excellent in color tone and exhibit high tinctorial strength and light fastness.

The pigment dispersion using the pigment of the invention can therefore be used suitably, for example, for ink for printing such as inkjet printing.

Example 201

[Manufacture of Color Filter by Using the Photolithographic Method]

The α crystal form azo pigment synthesized in Synthesis Example 1 was used. A 70-cc mayonnaise bottle was charged with the materials shown below. The bottle was shaken for 6 hours by using a disperser ("DAS 200", trade name; product of LAU GmbH) for six hours to separate the zirconia beads and obtain a pigment dispersion 201.

TABLE 5

| (Composition of Pigment dispersion 201) | |
|---|---|
| α Crystal form azo pigment | 0.6 g |
| 1,2-Propanediol 1-monomethyl ether 2-acetate (product of Tokyo Chemical Industry) | 5.0 g |
| Zirconia beads (0.3 mm in diameter) | 10 g |

Example 202

To the pigment dispersion 201 were added materials shown below and the resulting mixture was shaken for 30 minutes by using the above-described disperser to prepare a coloring composition 202 for color filter to be used in the photolithographic method.

TABLE 6

| (Composition of Coloring composition 202 for color filter) | |
|---|---|
| Pigment dispersion 201 | 15.6 g |
| Photosensitive resin ("Cyclomer P200", trade name; product of Daicel Chemical Industries) | 2.5 g |
| Pentaerythritol tetraacrylate (product of Aldrich) | 0.2 g |
| 2-Benzyl-2-dimethylamino-4'-morpholino-butyrophenone (product of Aldrich) | 0.05 g |
| 2,4-Diethyl-9H-thioxanthen-9-one | 0.05 g |
| 1,2-Propanediol 1-monomethyl ether 2-acetate (product of Tokyo Chemical Industry) | 0.8 g |
| Cyclohexanone (product of Tokyo Chemical Industry) | 0.2 g |

Example 203

The coloring composition 202 for color filter obtained in Example 202 was applied to a slide glass by using a bar coater Rod No. 10. The slide glass was then dried in an oven of 80° C. for five minutes to give an ink film.

A portion of the film was masked properly and the film was exposed to light using a high-pressure mercury lamp under the condition of 200 mJ/cm². The film was then developed with a 0.5% aqueous sodium carbonate solution at 25° C. and then dried in an oven of 220° C. for 20 minutes to form a color filter 203. The light transmittance of the resulting color filter was measured using a spectrophotometer ("U-3310", trade name; product of Hitachi, Ltd.). In addition, the wavelength, between the wavelengths from 540 to 610 nm, at which the light transmittance of the color filter 203 showed the lowest value was determined. The results are shown in Table 7.

Example 204

In similar manners to Examples 201 to Example 203 except that a pigment dispersion was obtained as in Example 201 except that 0.5 g of a surfactant (pigment wetting dispersant: "BYK-161", trade name; product of BYK Chemie) was added further as a dispersant to 0.6 g of the α crystal form azo pigment, a color filter 204 having an equal performance to that of the color filter 203 was obtained.

Comparative Examples 201 to 203

In similar manners to Examples 201 to Example 203 except that the azo pigment (D-1), C.I. Pigment Red 254 ("IRGAPHORE DPP RED", trade name; product of Ciba Specialty Chemicals), and the compound of the formula [I] were used respectively instead of the α crystal form azo pigment used in Example 201, comparative color filters 201 to 203 were prepared.

The light transmittance of the color filters thus obtained was measured and the wavelength at which the light transmittance showed the lowest value, the light transmittance at 590 nm, and light transmittance at 540 nm were determined. The results are shown in Table 7.

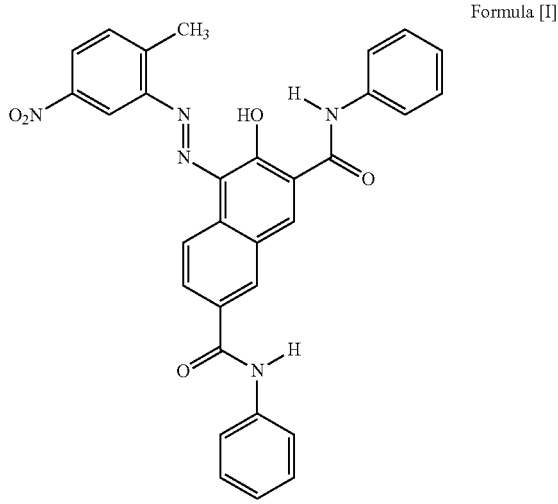

Formula [I]

TABLE 7

| Pigment | | Wavelength giving the lowest transmittance | Transmittance at 590 nm | Transmittance at 540 nm |
|---|---|---|---|---|
| Ex. 203 | α Crystal form azo pigment | 575 nm | 80% | 2% |
| Ex. 204 | α Crystal form azo pigment | 575 nm | 83% | 2% |

TABLE 7-continued

| Pigment | | Wavelength giving the lowest transmittance | Transmittance at 590 nm | Transmittance at 540 nm |
|---|---|---|---|---|
| Comp. Ex. 201 | Azo pigment (D-1) | 570 nm | 60% | 2% |
| Comp. Ex. 202 | C.I. Pigment Red 254 | 564 nm | 60% | 8% |
| Comp. Ex. 203 | Compound of the formula [I] | 562 nm | 55% | 5% |

The color filters of Examples 203 and 204 manufactured using the color-filter coloring composition of the invention containing the α crystal form azo pigment as a colorant and the color filters of Comparative Examples 201 to 203 show a sharp rise in transmittance curve and at the same time have an excellent transmittance curve with a high transmittance in a region from 650 to 750 nm. Further, the transmittance curve of the color filter of Comparative Example 201 has a high transmittance portion at 540 nm.

The color filters manufactured using the color-filter coloring composition of the invention have a very low transmittance of a blue light of from 350 to 400 nm and enable the display of a red color with high purity compared with the color filters obtained in Comparative Example 202 and Comparative Example 203.

This means that the color-filter coloring composition of the invention is useful because the coloring composition using the azo pigment represented by the formula (1) and having, in CuKα characteristic X-ray diffraction, a characteristic X-ray diffraction peak at Bragg angles (2θ±0.2°) of 6.9°, 17.9°, 21.5°, and 27.3° and a peak height at 11.9° of 0.6 or less relative to a peak height at 10.9° can provide a red color with a most suited hue, depending on the wavelength of a back light source of a display and therefore contribute to improvement in the color reproducibility.

[Evaluation of Heat Resistance]

Heat resistance test was performed using the color filters obtained in Example 203, Example 204, and Comparative Examples 201 to 203.

<Test Method of Heat Resistance>

The color filters were exposed to 250° C. for 90 minutes under the atmosphere and a color difference ($\Delta E^*_{ab}$) before and after the exposure was measured using a spectrophotometer ("Macbeth Coloreye-3000", trade name; product of Sakata Inx). The heat resistance was evaluated in accordance with the following criteria. The results are shown in Table 8.

<Judging Criteria>

A: $\Delta E^*_{ab} < 1.0$
B: $1.0 \leq \Delta E^*_{ab} < 0.1$
C: $1.1 \leq \Delta E^*_{ab}$

TABLE 8

| | Pigment | Test results of heat resistance Color difference ($\Delta E^*_{ab}$) |
|---|---|---|
| Example 203 | α Crystal form azo pigment | A |
| Example 204 | α Crystal form azo pigment | A |
| Comp. Ex. 201 | Azo pigment (D-1) | A |
| Comp. Ex. 202 | P.R. 254 | C |
| Comp. Ex. 203 | Compound of the formula [1] | B |

The color filters of Example 203 and Example 204 manufactured using the color-filter coloring composition of the invention containing the α crystal form azo pigment as a colorant exhibit equal or superior heat resistance to the color filters of Comparative Examples 201 to 203 manufactured using the respective pigments.

[Evaluation of Light Fastness]

The color filters of Examples 203 and 204 were exposed for 20 days to xenon light (170000 lux; in the presence of a cut-off filter of 325 nm or less, Suga Test Instruments) by using a fadeometer. The color difference ($\Delta E^*_{ab}$) before and after exposure was measured using a spectrophotometer ("Macbeth Coloreye-3000", trade name; product of Sakata Inx). The light resistance was evaluated in accordance with the following criteria. The results are shown in Table 9.

<Judging Criteria>
A: $\Delta E^*_{ab} \leq 2.0$
B: $2.0 \leq \Delta E^*_{ab} \leq 3.0$
C: $3.0 < \Delta E^*_{ab} \leq 6.0$
D: $6.0 < E^*_{ab}$

TABLE 9

| | Pigment | Test results of light fastness Color difference ($\Delta E^*_{ab}$) |
|---|---|---|
| Ex. 203 | α Crystal form azo pigment | B |
| Ex. 204 | α Crystal form azo pigment | B |
| Comp. Ex. 201 | Azo pigment (D-1) | B |
| Comp. Ex. 202 | P.R. 254 | D |
| Comp. Ex. 203 | Compound of the formula [I] | C |

The color filters of Examples 203 and 204 manufactured using the color-filter coloring composition of the invention containing the azo compound represented by the formula (1) as a colorant exhibit equal or superior light fastness to the color filters of Comparative Examples 201 to 203.

(Evaluation of Contrast)

The contrast of each of the color filters of Examples 203 and 204 and Comparative Examples 201 to 203 was measured using "contrast tester CT-1" (trade name; product of Tsubosaka Electric). The contrast≧23000 was ranked A, 23000>contrast≧18000 was ranked B, and 18000>contrast was ranked C. The results are shown in Table 10.

TABLE 10

| | Pigment | Contrast |
|---|---|---|
| Ex. 203 | α Crystal form azo pigment | A |
| Ex. 204 | α Crystal form azo pigment | A |
| Comp. Ex. 201 | Azo pigment (D-1) | A |
| Comp. Ex. 202 | P.R. 254 | A |
| Comp. Ex. 203 | Compound of the formula [I] | C |

The color filters of Examples 203 and 204 manufactured using the color-filter coloring composition of the invention containing the α crystal form azo pigment as a colorant are superior in contrast to the color filter of Comparative Example 203.

Example 301

[Manufacture of Color Filter by Using the Photolithographic Method]

The β crystal form azo pigment synthesized in Synthesis Example 11 was used. A 70-cc mayonnaise bottle was charged with the materials shown below. The bottle was shaken for 6 hours by using a disperser ("DAS 200", trade name; product of LAU GmbH) for six hours to separate the zirconia beads and obtain a pigment dispersion 301.

TABLE 11

| (Composition of Pigment dispersion 301) | |
|---|---|
| β Crystal form azo pigment | 0.6 g |
| 1,2-Propanediol 1-monomethyl ether 2-acetate (product of Tokyo Chemical Industry) | 5.0 g |
| Zirconia beads (0.3 mm in diameter) | 10 g |

Example 302

To the pigment dispersion 301 were added materials shown below and the resulting mixture was shaken for 30 minutes by using the above-described disperser to prepare a coloring composition 302 for color filter to be used in the photolithographic method.

TABLE 12

| (Composition of Coloring composition 302 for color filter) | |
|---|---|
| Pigment dispersion 301 | 15.6 g |
| Photosensitive resin ("Cyclomer P200", trade name; product of Daicel Chemical Industries) | 2.5 g |
| Pentaerythritol tetraacrylate (product of Aldrich) | 0.2 g |
| 2-Benzyl-2-dimethylamino-4'-morpholino-butyrophenone (product of Aldrich) | 0.05 g |
| 2,4-Diethyl-9H-thioxanthen-9-one | 0.05 g |
| 1,2-Propanediol 1-monomethyl ether 2-acetate (product of Tokyo Chemical Industry) | 0.8 g |
| Cyclohexanone (product of Tokyo Chemical Industry) | 0.2 g |

Example 303

The coloring composition 302 for color filter obtained in Example 302 was applied to a slide glass by using a bar coater Rod No. 10. The slide glass was then dried in an oven of 80° C. for five minutes to give an ink film.

A portion of the film was masked properly and the film was exposed to light using a high-pressure mercury lamp under the condition of 200 mJ/cm². The film was then developed with a 0.5% aqueous sodium carbonate solution at 25° C. and then dried in an oven of 220° C. for 20 minutes to form a color filter 303. The light transmittance of the resulting color filter was measured using a spectrophotometer ("U-3310", trade name; product of Hitachi, Ltd.). In addition, the wavelength, between the wavelengths from 540 to 610 nm, at which the light transmittance of the color filter 303 showed the lowest value was determined. The results are shown in Table 13.

Example 304

In similar manners to Examples 301 to Example 303 except that a pigment dispersion was obtained as in Example 301 except that 0.5 g of a surfactant (pigment wetting dispersant: "BYK-161", trade name; product of BYK Chemie) was added further as a dispersant to 0.6 g of the β crystal form azo pigment, a color filter 304 having an equal performance to that of the color filter 303 was obtained.

Comparative Examples 301 to 303

In similar manners to Examples 301 to Example 303 except that the azo pigment (D-1), C.I. Pigment Red 254 ("IRGAPHORE DPP RED", trade name; product of Ciba Specialty Chemicals), and the compound of the formula [I] were used respectively instead of the β crystal form azo pigment used in Example 301, comparative color filters 301 to 303 were prepared.

The light transmittance of the color filters thus obtained was measured and the wavelength at which the light transmittance showed the lowest value, the light transmittance at 650 nm, and light transmittance at 540 nm were determined. The results are shown in Table 13.

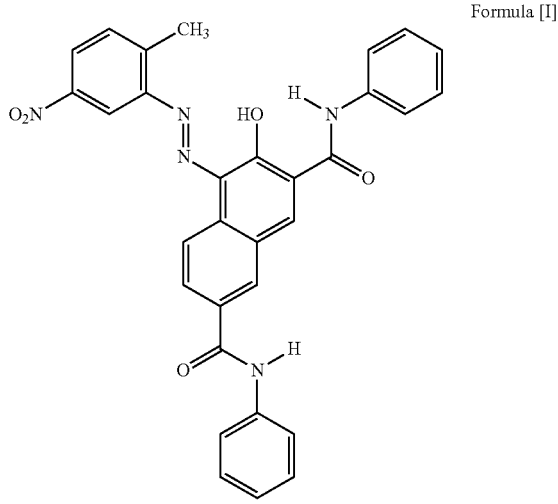

Formula [I]

TABLE 13

| Pigment | | Wavelength giving the lowest transmittance | Transmittance at 650 nm | Transmittance at 540 nm |
|---|---|---|---|---|
| Ex. 303 | β Crystal form azo pigment | 565 nm | 92% | 2% |
| Ex. 304 | β Crystal form azo pigment | 565 nm | 94% | 2% |
| Comp. Ex. 301 | Azo pigment (D-1) | 570 nm | 90% | 2% |
| Comp. Ex. 302 | P.R. 254 | 564 nm | 88% | 8% |
| Comp. Ex. 303 | Compound of the formula [I] | 562 nm | 65% | 5% |

The color filters of Examples 303 and 304 manufactured using the color-filter coloring composition of the invention containing the cc crystal form azo pigment as a colorant and the color filters of Comparative Examples 301 to 303 show a sharp rise in transmittance curve and at the same time have an excellent transmittance curve with a high transmittance in a region from 650 to 750 nm. Further, the transmittance curve of the color filter of Comparative Example 301 has a high transmittance portion at 540 nm.

The color filters manufactured using the color-filter coloring composition of the invention have a very low transmittance of a blue light of from 350 to 400 nm and enable the display of a red color with high purity compared with the color filters obtained in Comparative Example 302 and Comparative Example 303.

This means that the color-filter coloring composition of the invention is useful because the coloring composition using the azo pigment represented by the formula (1) and having, in CuKα characteristic X-ray diffraction, a characteristic X-ray diffraction peak at Bragg angles (2θ±0.2°) of 6.9°, 25.8°, and 27.1° and a peak height at 10.9° of 0.2 or less relative to a peak height at 11.9° can provide a red color with a most suited hue, depending on the wavelength of a back light source of a display and therefore contribute to improvement in the color reproducibility.

[Evaluation of Heat Resistance]

Heat resistance test was performed using the color filters obtained in Example 303, Example 304, and Comparative Examples 301 to 303.

<Test Method of Heat Resistance>

The color filters were exposed to 250° C. for 300 minutes under the atmosphere and a color difference ($\Delta E^*_{ab}$) before and after the exposure was measured using a spectrophotometer ("Macbeth Coloreye-3000", trade name; product of Sakata Inx). The heat resistance was evaluated in accordance with the following criteria. The results are shown in Table 14.

<Judging Criteria>

A: $\Delta E^*_{ab} < 1.0$
B: $1.0 \leq \Delta E^*_{ab} < 0.1$
C: $1.1 \leq \Delta E^*_{ab}$

TABLE 14

| Pigment | | Test results of heat resistance Color difference ($\Delta E^*_{ab}$) |
|---|---|---|
| Example 303 | β Crystal form azo pigment | A |
| Example 304 | β Crystal form azo pigment | A |
| Comp. Ex. 301 | Azo pigment (D-1) | B |
| Comp. Ex. 302 | P.R. 254 | C |
| Comp. Ex. 303 | Compound of the formula [1] | C |

The color filters of Example 303 and Example 304 manufactured using the color-filter coloring composition of the invention containing the β crystal form azo pigment as a colorant exhibit equal or superior heat resistance to the color filters of Comparative Examples 301 to 303 manufactured using the respective pigments.

[Evaluation of Light Fastness]

The color filters of Examples 303 and 304 were exposed for 40 days to xenon light (170000 lux; in the presence of a cut-off filter of 325 nm or less, Suga Test Instruments) by using a fadeometer. The color difference ($\Delta E^*_{ab}$) before and after exposure was measured using a spectrophotometer ("Macbeth Coloreye-3000", trade name; product of Sakata Inx). The light resistance was evaluated in accordance with the following criteria. The results are shown in Table 15.

<Judging Criteria>

A: $\Delta E^*_{ab} \leq 3.0$
B: $3.0 \leq \Delta E^*_{ab} \leq 6.0$
C: $6.0 < E^*_{ab}$

TABLE 15

| Pigment | | Test results of light fastness Color difference ($\Delta E^*_{ab}$) |
|---|---|---|
| Ex. 303 | β Crystal form azo pigment | A |
| Ex. 304 | β Crystal form azo pigment | A |
| Comp. Ex. 301 | Azo pigment (D-1) | B |
| Comp. Ex. 302 | P.R. 254 | C |
| Comp. Ex. 303 | Compound of the formula [I] | C |

The color filters of Examples 303 and 304 manufactured using the color-filter coloring composition of the invention containing the azo compound represented by the formula (1) as a colorant exhibit equal or superior light fastness to the color filters of Comparative Examples 301 to 303.

(Evaluation of Contrast)

The contrast of each of the color filters obtained in Example 303, Example 304, and Comparative Examples 301 to 303 was measured using "contrast tester CT-1" (trade name; product of Tsubosaka Electric). The contrast≧23000 was ranked A, 23000>contrast≧18000 was ranked B, and 18000>contrast was ranked C. The results are shown in Table 16.

TABLE 16

| | Pigment | Contrast |
|---|---|---|
| Ex. 303 | β Crystal form azo pigment | A |
| Ex. 304 | β Crystal form azo pigment | A |
| Comp. Ex. 301 | Azo pigment (D-1) | A |
| Comp. Ex. 302 | P.R. 254 | A |
| Comp. Ex. 303 | Compound of the formula [I] | C |

The color filters of Examples 303 and 304 manufactured using the color-filter coloring composition of the invention containing the β crystal form azo pigment as a colorant are superior in contrast to the color filter of Comparative Example 303.

Example 401

<Preparation of Green Pigment Dispersion>
—Preparation of Green Pigment Dispersion P1—

A mixture liquid containing 12. 6 parts of a 100/55 (mass ratio) mixture of C.I. Pigment Green 36 and C.I. Pigment Yellow 139 as a pigment, 5.2 parts of "DISPERBYK-2001" (trade name; product of BYK Chemie, solid content concentration: 45.1 mass %) as a dispersant, 2.7 parts of benzyl methacrylate/methacrylic acid copolymer (acid value: 134 mgKOH/g, MW=30,000) as a dispersion resin, and 78.3 parts of propylene glycol monomethyl ether acetate as a solvent was mixed and dispersed for 15 hours by using a bead mill to prepare Green pigment dispersion P1.

<Preparation of Red Pigment Dispersion>
—Preparation of Red Pigment Dispersion P2—

A mixed liquid containing 12. 1 parts of a 100/45 (mass ratio) mixture of the α crystal form azo pigment and C.I. Pigment Yellow 139 as a pigment, 10.4 parts of "DISPERBYK-2001" (trade name; product of BYK Chemie, solid content concentration: 45.1 mass %) as a dispersant, 3.8 parts of benzyl methacrylate/methacrylic acid copolymer (acid value: 134 mgKOH/g, MW=30,000) as a dispersion resin, and 73.7 parts of propylene glycol monomethyl ether acetate as a solvent was mixed and dispersed for 15 hours by using a bead mill to prepare Red pigment dispersion P2.

—Preparation of Red Pigment Dispersion P3—

A mixed liquid containing 12. 1 parts of a 100/45 (mass ratio) mixture of the β crystal form azo pigment and C.I. Pigment Yellow 139 as a pigment, 10.4 parts of "DISPERBYK-2001" (trade name; product of BYK Chemie, solid content concentration: 45.1 mass %) as a dispersant, 3.8 parts of benzyl methacrylate/methacrylic acid copolymer (acid value: 134 mgKOH/g, MW=30,000) as a dispersion resin, and 73.7 parts of propylene glycol monomethyl ether acetate as a solvent was mixed and dispersed for 15 hours by using a bead mill to prepare Red pigment dispersion P3.

<Preparation of Blue Pigment Dispersion>
—Preparation of Blue Pigment Dispersion P4—

A mixed liquid containing 14 parts of a 100/25 (mass ratio) mixture of C.I. Pigment Blue 15:6 and C.I. Pigment Violet 23 as a pigment, 4.7 parts of "DISPERBYK-2001" (trade name; product of BYK Chemie (BYK), solid content concentration: 45.1 mass %) as a dispersant, 3.5 parts of a benzyl methacrylate/methacrylic acid copolymer (acid value: 134 mgKOH/g, MW=30,000) as a dispersion resin, and 77.8 parts of propylene glycol monomethyl ether acetate as a solvent was mixed and dispersed for 15 hours by using a bead mill to prepare Blue pigment dispersion P4.

<Preparation of Green Colored Photosensitive Composition (Application Liquid)>

A colored photosensitive composition A-1 was prepared using the above-described Green pigment dispersion P1 and mixing and stirring the components shown below so as to give the following composition.

TABLE 17

| <Composition> | |
|---|---|
| The Green pigment dispersion P1 | 83.3 parts |
| Alkali soluble resin: P-1 | 2.05 parts |
| "OXE-01" (trade name of photopolymerization initiator; product of Chiba Specialty Chemicals) | 1.2 parts |
| Monomer 1: KARAYAD DPHA (trade name; product of Nippon Kayaku) | 1.4 parts |
| Monomer 2: M-305 (trade name; product of Toa Gosei) | 1.4 parts |
| p-Methoxyphenol | 0.001 part |
| Propylene glycol monomethyl ether acetate (PGMEA (which will hereinafter be abbreviated equally); solvent) | 7.4 parts |
| Surfactant: a 0.2% solution of PGMEA ("F-781", trade name; product of Dainippon Ink Chemicals) | 4.2 parts |

<Preparation of Red Colored Photosensitive Composition (Application Liquid) B-1>

A colored photosensitive composition B-1 was prepared using the above-described Red pigment dispersion P2 and mixing and stirring the components shown below so as to give the following composition.

TABLE 18

| <Composition> | |
|---|---|
| The Red pigment dispersion P2 | 59.6 parts |
| Alkali soluble resin: P-1 | 1.2 parts |
| "OXE-02" (trade name of photopolymerization initiator; product of Chiba Specialty Chemicals) | 0.7 part |
| Monomer 1: KARAYAD DPHA (trade name; product of Nippon Kayaku) | 1.6 parts |
| Monomer 2: SR-494 (trade name; product of Sartomer) | 1.6 parts |
| p-Methoxyphenol | 0.002 part |
| Propylene glycol monomethyl ether acetate (PGMEA (which will hereinafter be abbreviated equally); solvent) | 31 parts |
| Surfactant: a 0.2% solution of PGMEA ("F-781", trade name; product of Dainippon Ink Chemicals) | 4.2 parts |

<Preparation of Red Colored Photosensitive Composition (Application Liquid) C-1>

A colored photosensitive composition C-1 was prepared using the above-described Red pigment dispersion P3 and mixing and stirring the components shown below so as to give the following composition.

TABLE 19

| <Composition> | |
|---|---|
| The Red pigment dispersion P3 | 59.6 parts |
| Alkali soluble resin: P-1 | 1.2 parts |
| "OXE-02" (trade name of photopolymerization initiator; product of Chiba Specialty Chemicals) | 0.7 part |
| Monomer 1: KARAYAD DPHA (trade name; product of Nippon Kayaku) | 1.6 parts |
| Monomer 2: SR-494 (trade name; product of Sartomer) | 1.6 parts |
| p-Methoxyphenol | 0.002 part |

TABLE 19-continued

| <Composition> | |
|---|---|
| Propylene glycol monomethyl ether acetate (PGMEA (which will hereinafter be abbreviated equally); solvent) | 31 parts |
| Surfactant: a 0.2% solution of PGMEA ("F-781", trade name; product of Dainippon Ink Chemicals) | 4.2 parts |

<Preparation of Blue Colored Photosensitive Composition (Application Liquid) D-1>

A colored photosensitive composition D-1 was prepared using the above-described Blue pigment dispersion P4 and mixing and stirring the components shown below so as to give the following composition.

TABLE 20

| <Composition> | |
|---|---|
| The Blue pigment dispersion P4 | 50.6 parts |
| Alkali soluble resin: P-1 | 2.1 parts |
| "OXE-01" (trade name of photopolymerization initiator; product of Chiba Specialty Chemicals) | 1.2 parts |
| Monomer 1: KARAYAD DPHA (trade name; product of Nippon Kayaku) | 1.2 parts |
| Monomer 2: SR-494 (trade name; product of Sartomer) | 3.5 parts |
| p-Methoxyphenol | 0.002 part |
| Propylene glycol monomethyl ether acetate (PGMEA (which will hereinafter be abbreviated equally); solvent) | 36 parts |
| Surfactant: a 0.2% solution of PGMEA ("F-781", trade name; product of Dainippon Ink Chemicals) | 4.2 parts |

A photocurable film was formed by applying the Green colored photosensitive composition A-1 prepared above to an 8-inch silicon wafer which had having devices formed thereon and sprayed with hexamethyldisilazane in advance. The resulting film was heat treated (prebaked) for 180 seconds on a hot plate of 100° C. to give a dry film thickness of 1.0 μm. Then, the film was exposed to light at a wavelength of 365 nm through a 1.0-μm-square Bayer pattern mask at exposure amounts of from 50 to 1000 mJ/cm² (while changing the exposure amount by 50 mJ/cm²) by using an i-line stepper exposure apparatus "FPA-3000i5+" (trade name; product of Canon Inc.). The silicon wafer having the exposed film formed thereon was mounted on a horizontal rotating table of a spin shower development machine (DW-30, trade name: product of Chemitronics Co. Ltd/) and was subjected to puddle development at 23° C. for 180 seconds with a 40% diluted solution of "CD-2000" (trade name; product of Fujifilm Electronic Materials), thereby forming a color pattern on the silicon wafer.

The silicon wafer having thereon the color pattern was fixed on the horizontal rotating table using a vacuum chuck system and rinsed with pure water showered down from a jet nozzle from above the center of rotation while being rotated by using a rotator at a rotation speed of 50 rpm. The silicon wafer was then spray dried.

The wafer was then heated for 5 minutes on a hot plate of 200° C. to obtain a color filter having a pattern formed thereon.

A color filter 401 having RGB patterns was formed by repeating the same steps as those employed for the formation of green patterns except that each of the red colored photosensitive composition B-1 and the blue colored photosensitive composition D-1 was used and the prebaked film was exposed through a 1.0-μm square island pattern mask.

A color filter 402 having RGB patterns was formed by repeating the same steps as those employed for the formation of green patterns except that each of the red colored photosensitive composition C-1 and the blue colored photosensitive composition D-1 was used and the prebaked film was exposed through a 1.0-μm square island pattern mask.

It has been found that a camera module manufactured using the device having the color filters 401 and 402 formed thereon has good spectroscopic properties.

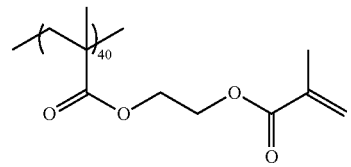

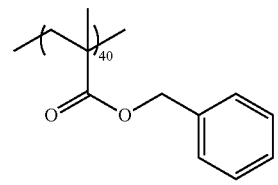

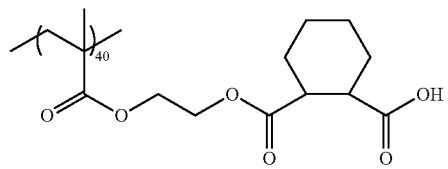

Resin P-1

Acid value: 54 mgKOH/g

Mw: 15,000

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An azo pigment consisting of:

an α crystal form azo pigment represented by the following formula (1), which has:

a characteristic X-ray diffraction peak at Bragg angles (2θ±0.2°) of 6.9°, 21.5°, and 27.3° in CuKα characteristic X-ray diffraction, a peak height at 11.9° of 0.6 or less relative to a peak height at 10.9° or a tautomer thereof, or a salt, hydrate, or solvate of the azo pigment or tautomer thereof; or a β crystal form azo pigment represented by the following formula (1), which has:

a characteristic X-ray diffraction peak at Bragg angles (2θ±0.2°) of 6.9°, 25.8°, and 27.1° in CuKα characteristic X-ray diffraction, a peak height at 10.9° of 0.2 or less relative to a peak height at 11.9° or a tautomer thereof, or a salt, hydrate, or solvate of the azo pigment or tautomer thereof (1)

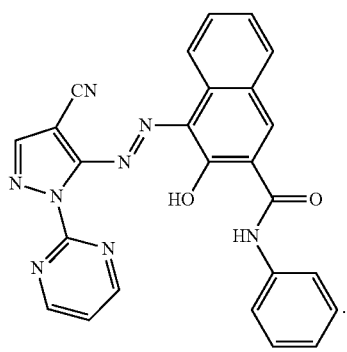

2. A process for producing an a α crystal form azo pigment represented by the following formula (1) having a characteristic X-ray diffraction peak at Bragg angles(2θ±0.2°) of 6.9°, 21.5°, and 27.3° in CuKα characteristic X-ray diffraction and a peak height at 11.9° of 0.6 or less relative to a peak height at 10.9° or a tautomer thereof, comprising:

effecting an azo coupling reaction between a diazonium salt derived from a heterocyclic amine represented by the following formula (2) and a compound represented by the following formula (3);

(1)

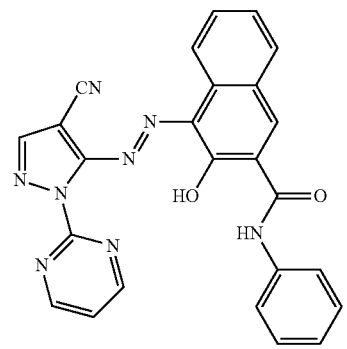

(2)

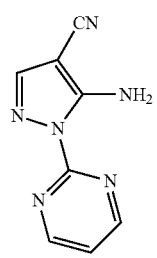

drying the azo pigment to a water content of 0% or greater but less than 5%; and an after-treating.

3. The process for producing the α crystal form azo pigment or tautomer thereof according to claim 2, wherein the after-treating is solvent heating treatment with a solvent having an SP value of from 7.0 to 14.0.

4. The process for producing the α crystal form azo pigment or tautomer thereof according to claim 2, wherein the azo pigment has a characteristic X-ray diffraction peak at Bragg angles (2θ±0.2°) of 6.9°, 17.9°, 21.5°, and 27.3° in CuKα characteristic X-ray diffraction and a peak height at 11.9° of 0.6 or less relative to a peak height at 10.9°.

5. A process for producing β crystal form azo pigment represented by the following formula (1) having a characteristic X-ray diffraction peak at Bragg angles (2θ±0.2°) of 6.9°, 25.8°, and 27.1° in CuKα characteristic X-ray diffraction and a peak height at 10.9° of 0.2° or less relative to a peak height at 11.9° or a tautomer thereof, comprising:

effecting an azo coupling reaction between a diazonium salt derived from a heterocyclic amine represented by the following formula (2) and a compound represented by the following formula (3); and (3)

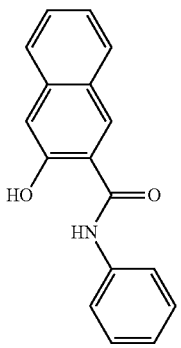

(1)

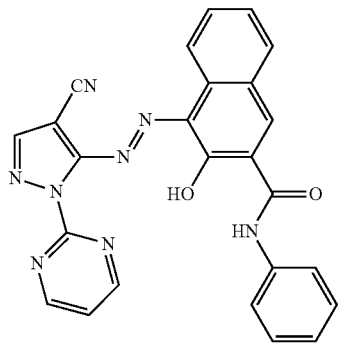

(2)

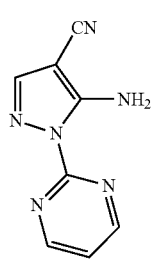

-continued (3)

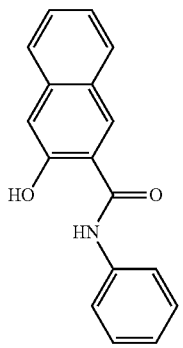

after-treating a composition containing water and the azo pigment or tautomer thereof in a water content of 50 mass % or greater but not greater than 200 mass %.

6. The process for producing the azo pigment or tautomer thereof according to claim 5, wherein the after-treating is solvent heating treatment with a solvent having an SP value of from 7.0 to 14.0.

7. The process for producing the a β crystal form azo pigment or tautomer thereof according to claim 5, wherein the azo pigment has a characteristic X-ray diffraction peak at Bragg angles (2θ±0.2°) of 6.9°, 11.9°, 23.8°, 25.8°, 26.7°, and 27.1° in CuKα characteristic X-ray diffraction and a peak height at 10.9° of 0.2 or less relative to a peak height at 11.9°.

8. An α crystal form azo pigment or tautomer thereof obtained by the production process according to claim 2, or a salt, hydrate or solvate thereof.

9. A β crystal form azo pigment or tautomer thereof obtained by the production process according to claim 5, or a salt, hydrate or solvate thereof.

10. A pigment dispersion comprising at least the azo pigment, tautomer, salt, hydrate, or solvate according to any one of claim 1, 8, or 9.

11. A coloring composition comprising the pigment dispersion according to claim 10.

12. An inkjet recording ink comprising the coloring composition according to claim 11.

13. A coloring composition for color filter, comprising the coloring composition according to claim 11.

14. A color filter produced by using the coloring composition for color filter according to claim 13.

* * * * *